US010848929B2

(12) United States Patent
Huang et al.

(10) Patent No.: US 10,848,929 B2
(45) Date of Patent: Nov. 24, 2020

(54) APPARATUS, SYSTEM AND METHOD OF TERMINATING A NEIGHBOR AWARENESS NETWORKING (NAN) PATH

(71) Applicant: INTEL IP CORPORATION, Santa Clara, CA (US)

(72) Inventors: Po-Kai Huang, San Diego, CA (US); Emily H. Qi, Gig Harbor, WA (US); Elad Oren, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 44 days.

(21) Appl. No.: 16/288,328

(22) Filed: Feb. 28, 2019

(65) Prior Publication Data

US 2019/0268731 A1    Aug. 29, 2019

Related U.S. Application Data

(63) Continuation of application No. 15/394,866, filed on Dec. 30, 2016, now Pat. No. 10,257,666.

(Continued)

(51) Int. Cl.
  *H04W 4/08* (2009.01)
  *H04W 76/25* (2018.01)
  *H04W 76/38* (2018.01)

(52) U.S. Cl.
  CPC .......... *H04W 4/08* (2013.01); *H04W 76/25* (2018.02); *H04W 76/38* (2018.02)

(58) Field of Classification Search
  CPC ....... H04W 4/08; H04W 76/25; H04W 76/38; H04W 8/005; H04W 84/12; H04W 76/14; H04W 76/40; H04L 67/16
  See application file for complete search history.

(56) References Cited

U.S. PATENT DOCUMENTS 10,257,666 B2    4/2019  Huang et al.
2008/0089290 A1*  4/2008  Coulas ............... H04W 76/38
                                                370/331

(Continued)

FOREIGN PATENT DOCUMENTS

WO    2015115829    8/2015
WO    2015119440    8/2015
WO    2016007784    1/2016

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Hashim S Bhatti
(74) *Attorney, Agent, or Firm* — Shichrur & Co.

(57) ABSTRACT

Some demonstrative embodiments include apparatuses, systems and/or methods of terminating a Neighbor Awareness Networking (NAN) path. For example, an apparatus may include logic and circuitry configured to cause a first NAN device to transmit a message including a NAN Data Link (NDL) attribute corresponding to an NDL with a second NAN device, the NDL attribute including a Maximal (Max) Idle Period field to indicate a time period during which the second NAN device is allowed to refrain from transmitting over the NDL without the NDL being terminated; and to allow the first NAN device to terminate all NAN Data Paths (NDPs) over the NDL, if any frame is not received from the second NAN device for at least the time period indicated by the Max Idle Period field.

22 Claims, 7 Drawing Sheets

Related U.S. Application Data

(60) Provisional application No. 62/338,026, filed on May 18, 2016, provisional application No. 62/427,306, filed on Nov. 29, 2016.

(56) References Cited

U.S. PATENT DOCUMENTS

| | | | |
|---|---|---|---|
| 2010/0202354 A1* | 8/2010 | Ho | G06Q 10/06 370/328 |
| 2014/0321448 A1* | 10/2014 | Backholm | H04L 69/16 370/338 |
| 2014/0376519 A1 | 12/2014 | Yang et al. | |
| 2015/0319675 A1 | 11/2015 | Park et al. | |
| 2015/0350875 A1* | 12/2015 | Chhabra | H04W 36/00835 455/432.1 |
| 2016/0014669 A1 | 1/2016 | Patil et al. | |
| 2016/0135045 A1* | 5/2016 | Lee | H04L 63/08 726/9 |
| 2016/0286398 A1* | 9/2016 | Abraham | H04W 12/06 |
| 2017/0019865 A1* | 1/2017 | Wang | H04W 48/08 |
| 2017/0026901 A1* | 1/2017 | Patil | H04W 48/16 |
| 2017/0094554 A1* | 3/2017 | Liu | H04W 8/005 |
| 2017/0201866 A1* | 7/2017 | Liu | H04W 4/80 |
| 2017/0311341 A1* | 10/2017 | Patil | H04W 68/02 |
| 2017/0339533 A1 | 11/2017 | Huang et al. | |

OTHER PUBLICATIONS

Wi-Fi Neighbour Awareness Networking (NAN), Technical Specification,Version 1.0, May 1, 2015, 98 pages.
Wi-Fi Peer-to-Peer (P2P), Technical Specification, Version 1.5, 2014, Aug. 4, 2014, 183 pages.
International Search Report and Written Opinion for PCT/US2017/032589, dated Jul. 24, 2017, 12 pages.
International Preliminary Report on Patentability for International Application No. PCT/US2017/032589, dated Nov. 29, 2018, 9 pages.
Office Action for U.S. Appl. No. 15/394,866, dated Jul. 10, 2018, 24 pages.
Notice of Allowance for U.S. Appl. No. 15/394,866, dated Nov. 29, 2018, 14 Pages.
European Search Report for European Patent Application No. 17799933.1, dated Jan. 7, 2020, 7 pages.
Office Action for European Patent Application No. 17 799 933.1, dated Oct. 12, 2020, 8 pages.

* cited by examiner

502 — Transmit from a first Neighbor Awareness Networking (NAN) device a message including a NAN Data Link (NDL) attribute corresponding to an NDL with a second NAN device, the NDL attribute including a Maximal (Max) Idle Period field to indicate a time period during which the second NAN device is allowed to refrain from transmitting over the NDL without the NDL being terminated 504 — Allow the first NAN device to terminate all NAN Data Paths (NDPs) over the NDL, if any frame is not received from the second NAN device for at least the time period indicated by the Max Idle Period field

Fig. 5

APPARATUS, SYSTEM AND METHOD OF TERMINATING A NEIGHBOR AWARENESS NETWORKING (NAN) PATH

CROSS REFERENCE

This application claims the benefit of and priority from U.S. Provisional Patent Application No. 62/338,026 entitled "APPARATUS, SYSTEM AND METHOD OF TERMINATING A NAN PATH", filed May 18, 2016, and U.S. Provisional Patent Application No. 62/427,306 entitled "APPARATUS, SYSTEM AND METHOD OF TERMINATING A NAN PATH", filed Nov. 29, 2016, the entire disclosures of which are incorporated herein by reference.

TECHNICAL FIELD

Embodiments described herein generally relate to terminating a Neighbor Awareness Networking (NAN) path.

BACKGROUND

Awareness networking, for example, according to a Wi-Fi Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 5 is a schematic flow-chart illustration of a method of terminating a NAN Path, in accordance with some demonstrative embodiments.

DETAILED DESCRIPTION

Figure 1:
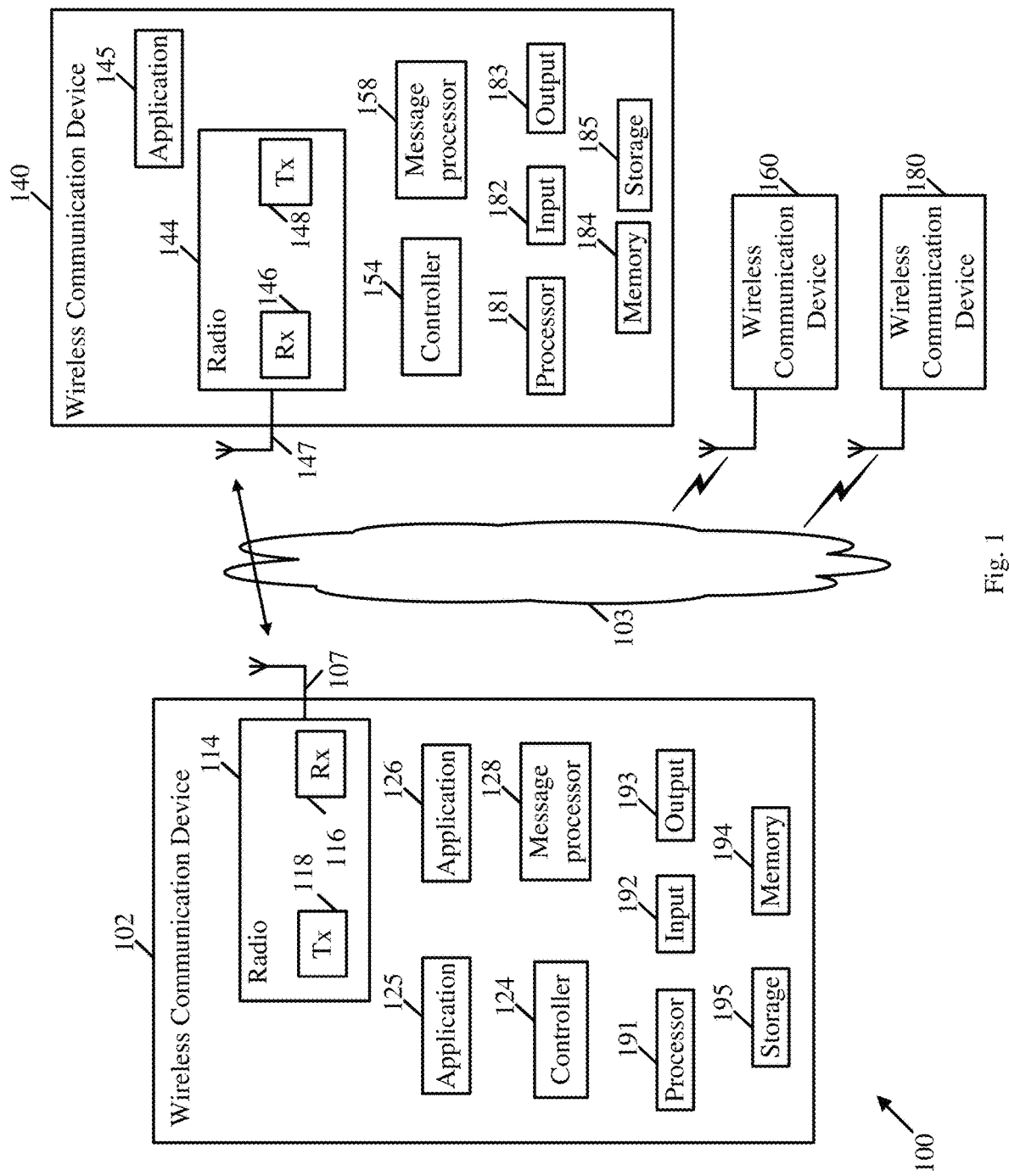
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing (WiFi) Alliance (WFA) Specifications (including *Wi-Fi Neighbor Awareness Networking (NAN) Technical Specification*, Version 1.0, May 1, 2015) and/or future versions and/or derivatives thereof, devices and/or networks operating in accordance with existing WFA Peer-to-Peer (P2P) specifications (*WiFi P2P technical specification*, version 1.5, Aug. 4, 2014) and/or future versions and/or derivatives thereof, devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D6.0, June* 2016, *draft standard for Information technology—Telecommunications and information exchange between systems Local and metropolitan area networks Specific requirements; Part* 11: *Wireless LAN Medium Access Control* (*MAC*) *and Physical Layer* (*PHY*) *Specification*"); IEEE 802.11ax (*IEEE* 802.11*ax, High Efficiency WLAN* (*HEW*)); IEEE 802.11ay (*P802.11ay Standard for Information Technology—Telecommunications and Information Exchange Between Systems Local and Metropolitan Area Networks—Specific Requirements Part* 11: *Wireless LAN Medium Access Control* (*MAC*) *and Physical Layer* (*PHY*) *Specifications—Amendment: Enhanced Throughput for Operation in License-Exempt Bands Above* 45 *GHz*)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., including wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more Bluetooth (BT) devices.

In some demonstrative embodiments, devices 102, 140, 160 and/or 180 may include, operate as, and/or perform the functionality of one or more Neighbor Awareness Networking (NAN) STAs.

In some demonstrative embodiments, devices 102, 140, 160 and/or 180 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102, 140, 160 and/or 180 may include, operate as, and/or perform the functionality of any other devices and/or STAs.

In some demonstrative embodiments, devices 102, 140, 160 and/or 180 may be configured to operate as, and/or to perform the functionality of, an access point (AP) STA.

In some demonstrative embodiments, devices 102, 140, 160 and/or 180 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, device 102 may be configured to operate as, and/or to perform the functionality of an AP STA, and/or device 140 may be configured to operate as, and/or to perform the functionality of a non-AP STA.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may operate as and/or perform the functionality of one or more WFD devices.

In one example, wireless communication devices 102, 140, 160 and/or 180 may include, may operate as, and/or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

Some demonstrative embodiments are described herein with respect to one or more NAN devices communicating as part of a NAN network, e.g., a NAN cluster. However, embodiments are not limited to these demonstrative embodiments, and other embodiments may be implemented with respect to any other type of devices and/or STAs communicating as part of any other group, service set, and/or network.

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may operate as and/or perform the functionality of WFD P2P devices. For example, devices 102, 140, 160 and/or 180 may be able to operate as and/or perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, to share, and/or to use one or more services, e.g., a social application, a file sharing application, a media application and/or the like, for example, using an awareness network, NAN network ("WiFi Aware network"), a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more operations and/or functionalities of devices 102, 140, 160 and/or 180, for example, one or more operations and/or functionalities of communication, e.g., awareness networking communications, WiFi Aware (NAN) communication and/or any other communication, between devices 102, 140, 160 and/or 180 and/or other devices, and/or any other functionality, e.g., as described below.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, controller 124 may perform one or more one or more operations and/or functionalities of, and/or may cause device 102 to perform one or more operations and/or functionalities of, a NAN engine, e.g., a NAN Discovery Engine (DE), for example to process one or more service queries and/or responses, e.g., from applications and/or services on devices 102 and/or 140, and/or one or more other devices.

In some demonstrative embodiments, controller 154 may perform one or more one or more operations and/or functionalities of, and/or may cause device 140 to perform one or more operations and/or functionalities of, a NAN engine, e.g., a NAN Discovery Engine (DE), for example to process one or more service queries and/or responses, e.g., from applications and/or services on devices 102 and/or 140, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, controllers 124 and/or 154, and/or message processors 128 and/or 158 may perform one or more operations and/or functionalities of, and/or may cause a STA to perform one or more operations and/or functionalities of, a NAN MAC, which may be configured to generate, process and/or handle one or more NAN messages, e.g., NAN Beacon frames and/or NAN Service Discovery Frames (SDFs).

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may operate as and/or perform the functionality of a device or station, for example, an awareness networking device, a NAN device, a WiFi device, a WiFi Aware device, a WFD device, a WLAN device, a Low Power Long Range (LPLR) device, and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., one or more of wireless communication devices 102, 140, 160 and/or 180, may include one or more blocks and/or entities to perform network awareness functionality. For example, a device, e.g., one or more of devices 102, 140, 160 and/or 180, may be capable of performing the functionality of a NAN device, which may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., a directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may operate as and/or perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may operate as and/or perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other additional or alternative channel may be used as the social channel.

In some demonstrative embodiments, devices 102, 140, 160 and/or 180 may transmit discovery frames, e.g., SDFs, during the plurality of DWs, e.g., over the social channel and/or any other channel, which may be used for discovery. For example the NAN AM may advertise the time of the DW, during which NAN devices may exchange SDFs.

In one example, devices 102, 140, 160 and/or 180 may transmit the discovery frames to discover each other, for example, to enable using the one or more services provided by applications 125, 126 and/or 145.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, for example, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability Attribute is to be awake and available to send and/or receive data in a specified method. In another example, the availability information may include any other additional or alternative information, and/or may be communicated and/or formatted in any other manner.

In some demonstrative embodiments, devices 102, 140, 160 and/or 180 may be part of an awareness cluster, e.g., a NAN cluster.

In some demonstrative embodiments, devices 102, 140, 160 and/or 180 may form the NAN cluster.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form the NAN cluster and may synchronize to the same clock, e.g., as described above.

In one example, all devices of the NAN cluster, may converge on a time period and channel, e.g., one or more DWs, to facilitate the discovery of services of devices 102, 140, 160 and/or 180, and/or to achieve low power consumption, e.g., as described above.

In some demonstrative embodiments, devices 102, 140, 160 and/or 180 may be configured to utilize NAN as a power efficient, and/or scalable, peer to peer technology, for example, to enable Wi-Fi devices to discover devices and/or services in their close proximity, and/or to setup one or more data paths with one or more peer devices.

For example, devices 102, 140, 160 and/or 180 may be configured to form a NAN cluster for devices in proximity, and devices in the same NAN cluster may follow the same awake time schedule, e.g., the same DWs, to facilitate cluster formation and/or achieve low power operation, e.g., as described above.

In some demonstrative embodiments, devices 102, 140, 160 and/or 180 may transmit NAN Service Discovery frames, for example, during the DWs, e.g., to publish services that the devices are interested or provide and/or to subscribe to one or more published services, e.g., as described above.

In some demonstrative embodiments, when a desired service is discovered, two NAN devices may set up a peer to peer NAN Data Path (NDP), for example, over a NAN Data Link (NDL) between the two NAN devices, which may enable to transmit data packets between the two NAN devices.

In some demonstrative embodiments, two or more devices, for example, devices 102 and/or 140, may wish to communicate with each other. The two or more devices may establish a Service Data Session (SDS), during which the two devices may set up a NAN Data Path (NDP) and/or a NAN data link (NDL), e.g., to support this SDS or more SDSs.

In some demonstrative embodiments, devices 102, 140, 160 and/or 180 may be configured to perform one or more operations of a procedure, e.g., a data path setup procedure, for setting up a NAN service, e.g., a unicast service and/or a multicast service.

In some demonstrative embodiments, devices 102, 140, 160 and/or 180 may be configured to perform one or more operations of a procedure, e.g., a NAN data path (NDP) negotiation procedure, for example, to setup a unicast service, for example, to enable data transmission between two NAN devices, for example, NAN2 devices, e.g., between devices 102 and 140.

Figure 2:
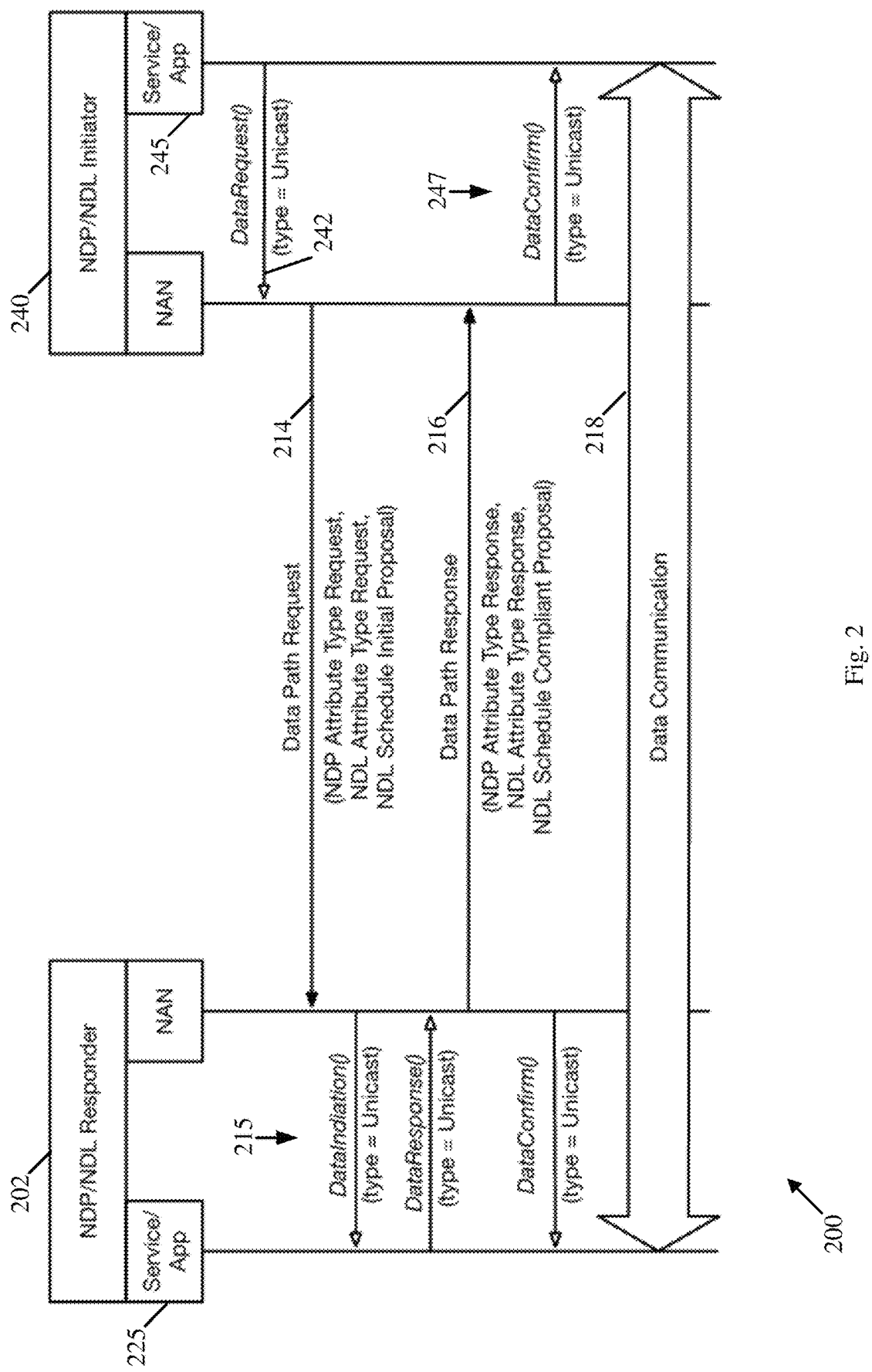
FIG. 2 is a schematic illustration of communications and operations according to a Neighbor Awareness Networking (NAN) Data Path (NDP) setup procedure, which may be implemented in accordance with some demonstrative embodiments.

Reference is made to FIG. 2, which schematically illustrates communications and operations according to an NDP setup procedure 200 between a NAN initiator device 240 and a NAN responder device 202, which may be implemented, in accordance with some demonstrative embodiments.

In some demonstrative embodiments, NDP setup procedure 200 may be implemented, for example, e.g., by devices 102, 140, 160 and/or 180 (FIG. 1), for example, for a unicast service. For example, device 102 (FIG. 1) may perform one or more operations, and/or one or more functionalities of NAN responder device 202, and/or device 140 (FIG. 1) may perform one or more operations, and/or one or more functionalities of NAN initiator device 240.

In some demonstrative embodiments, as shown in FIG. 2, an application and/or a service 245 of device 240 may request (242) to utilize, use and/or share an application and/or a service 225 of device 202.

In some demonstrative embodiments, as shown in FIG. 2, device 240 may transmit a data path request 214 to device 202, for example, to setup an NDP between devices 202 and 240, e.g., for a unicast service.

In some demonstrative embodiments, as shown in FIG. 2, device 202 may receive data path request 214, and may perform one or more operations 215 to confirm to establish the NDP for the unicast service between devices 202 and 240.

In some demonstrative embodiments, as shown in FIG. 2, device 202 may transmit a data path response 216 to device 240, for example, to complete to establish the NDP for the unicast service between devices 202 and 240.

In some demonstrative embodiments, as shown in FIG. 2, device 240 may receive data path response 216, and may perform one or more operations 247 to complete to establish the NDP for the unicast service between devices 202 and 240.

In some demonstrative embodiments, as shown in FIG. 2, devices 202 and 240 may perform data communication 218 between devices 202 and 240, for example, over the NDP for the unicast service between devices 202 and 240.

Referring back to FIG. 1, in some demonstrative embodiments, devices 102, 140, 160 and/or 180 may be configured to perform one or more operations of a procedure, e.g., a NAN multicast service group (NMSG) procedure, for example, to form an NMSG, e.g., for providing a multicast service.

In some demonstrative embodiments, devices 102, 140, 160 and/or 180 may be configured to operate as, and/or perform the functionality of, an enroller, and/or to operate as, and/or perform the functionality of, an enrollee.

In some demonstrative embodiments, the enroller may be configured to provide information for the NMSG, and/or to provide schedule information.

In some demonstrative embodiments, the enrollee may be configured, for example, to enroll to the NMSG, for example, through the enroller, e.g., to receive the multicast service.

In some demonstrative embodiments, the enrollee may be configured, for example, to enroll to the NMSG, for example, explicitly or implicitly, e.g., as described below.

Figure 3:
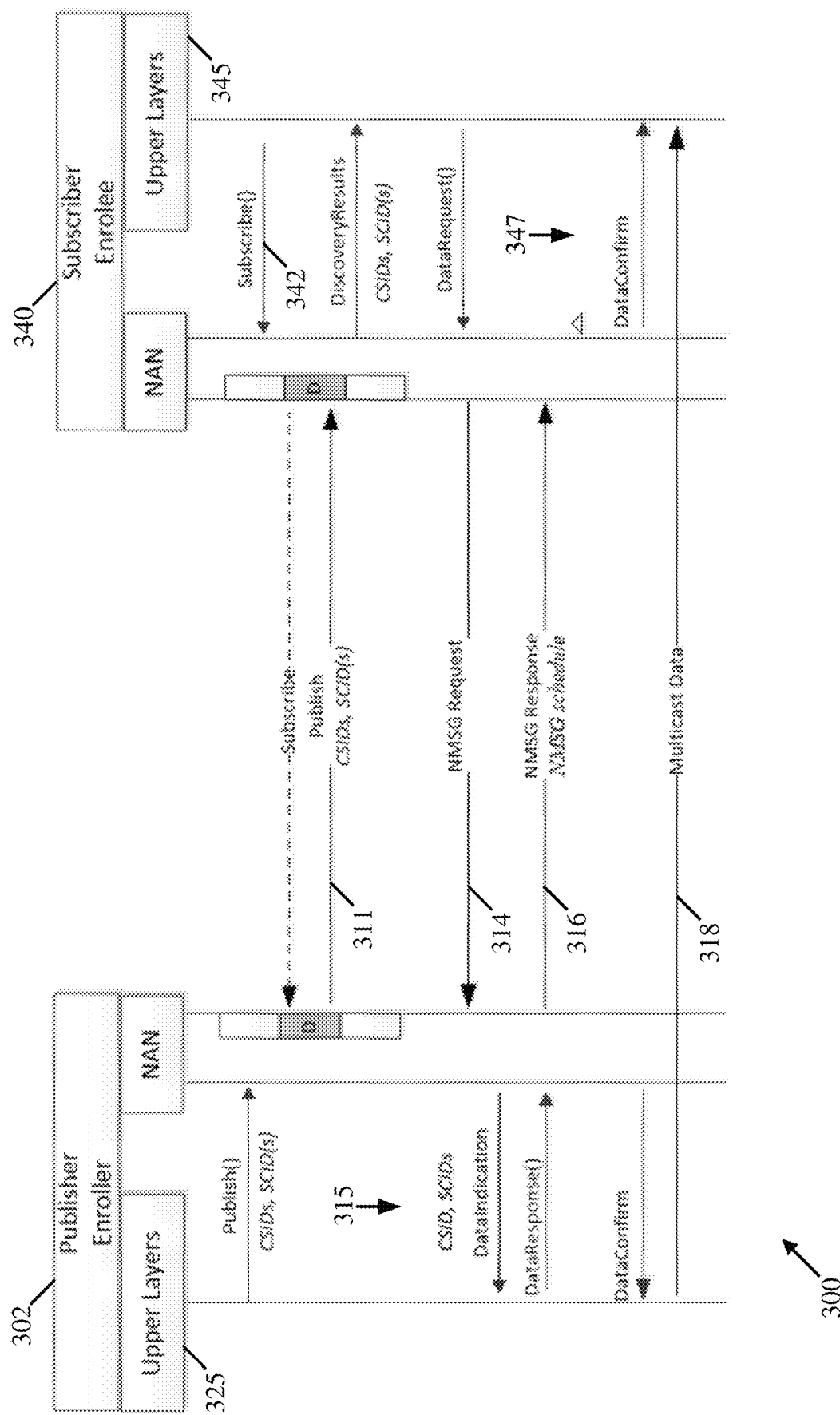
FIG. 3 is a schematic illustration of communications and operations between a NAN enrollee device and a NAN enroller device according to a NAN Multicast Service Group (NMSG) enrolment procedure, which may be implemented in accordance with some demonstrative embodiments.

Reference is made to FIG. 3, which schematically illustrates communications and operations between a NAN enroller device 302 and a NAN enrollee device 340 according to an NMSG enrolment procedure 300, which may be implemented, in accordance with some demonstrative embodiments.

In some demonstrative embodiments, NMSG enrolment procedure 300 may include an NMSG explicit enrolment, for example, for a multicast service.

In some demonstrative embodiments, NMSG enrolment procedure 300 may be implemented, for example, e.g., by devices 102, 140, 160 and/or 180 (FIG. 1), for example, for a multicast service. For example, device 102 (FIG. 1) may perform one or more operations, and/or one or more functionalities of NAN enroller device 302, and/or device 140 (FIG. 1) may perform one or more operations, and/or one or more functionalities of NAN enrollee device 340.

In some demonstrative embodiments, as shown in FIG. 3, an application and/or a service 345 of device 340 may request (342) to subscribe to a service, for example, for a multicast service 325, which may be published by enroller 302.

In some demonstrative embodiments, as shown in FIG. 3, enroller 302 may publish (311) the multicast service.

In some demonstrative embodiments, as shown in FIG. 3, device 340 may transmit an NMSG request 314 to device 302, for example, to enroll to the NMSG.

In some demonstrative embodiments, as shown in FIG. 3, device 302 may receive NMSG request 314, and may perform one or more operations 315, for example, to enroll to the NMSG.

In some demonstrative embodiments, as shown in FIG. 3, device 302 may transmit an NMSG response 316 to device 340, for example, to complete the enrolment to the NMSG.

In some demonstrative embodiments, as shown in FIG. 3, device 340 may receive NMSG response 316, and may perform one or more operations 347 to complete the enrolment for the multicast service.

In some demonstrative embodiments, as shown in FIG. 3, devices 302 may transmit multicast data 318, which may be received by device 340.

Figure 4:
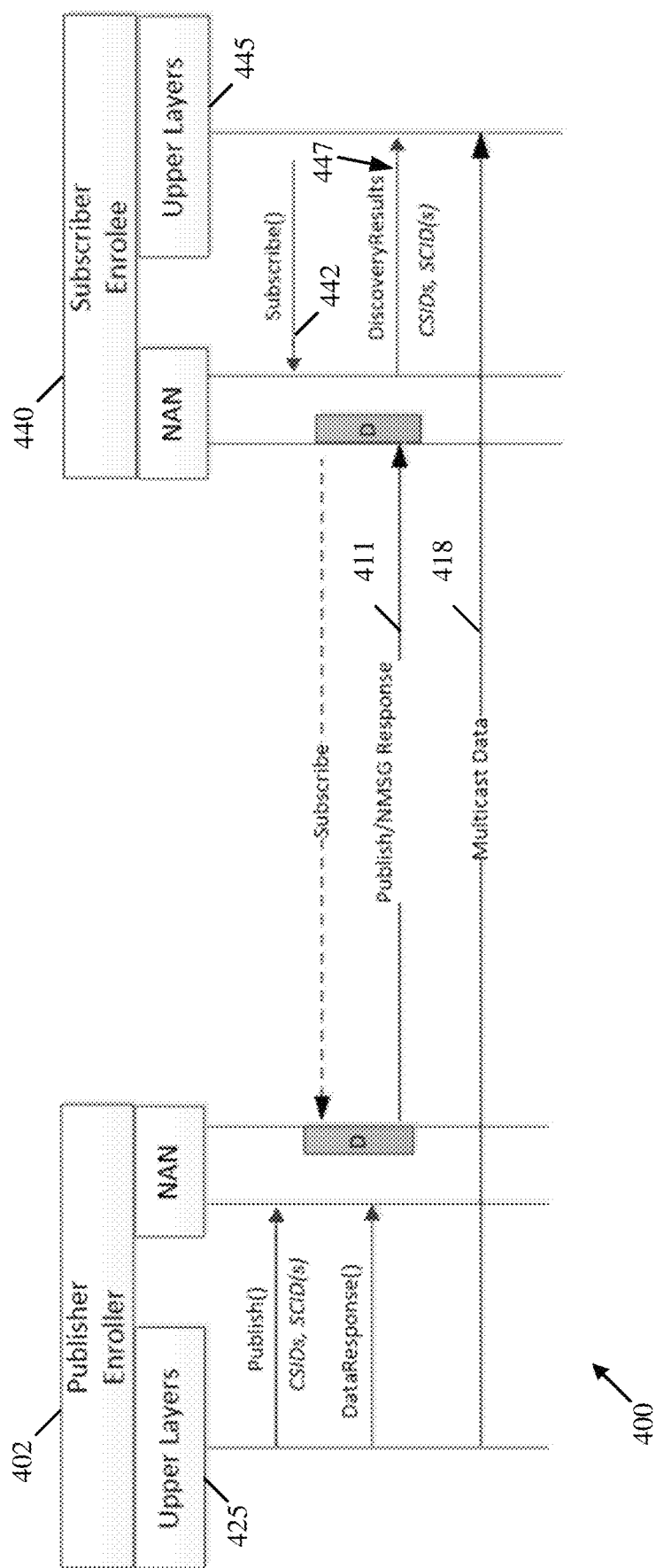
FIG. 4 is a schematic illustration of communications and operations between a NAN enrollee device and a NAN enroller device according to an NMSG enrolment procedure, which may be implemented in accordance with some demonstrative embodiments.

Reference is made to FIG. 4, which schematically illustrates communications and operations between a NAN enroller device 402 and a NAN enrollee device 440 according to an NMSG enrolment procedure 400, which may be implemented, in accordance with some demonstrative embodiments.

In some demonstrative embodiments, NMSG enrolment procedure 400 may include an NMSG implicit enrolment, for example, for a multicast service.

In some demonstrative embodiments, NMSG enrolment procedure 400 may be implemented, for example, e.g., by devices 102, 140, 160 and/or 180 (FIG. 1), for example, for a multicast service. For example, device 102 (FIG. 1) may perform one or more operations, and/or one or more functionalities of NAN enroller device 402, and/or device 140 (FIG. 1) may perform one or more operations, and/or one or more functionalities of NAN enrollee device 440.

In some demonstrative embodiments, as shown in FIG. 4, an application and/or a service 445 of device 440 may request (442) to subscribe to a service, for example, for a multicast service 425, which may be published by enroller 402.

In some demonstrative embodiments, as shown in FIG. 4, enroller 402 may send a message 411 to publish the multicast service.

In some demonstrative embodiments, message 411 may include a publish message or an NMSG response, for example, to enable devices, e.g., device 440, to use the multicast service.

In some demonstrative embodiments, as shown in FIG. 4, device 440 may receive message 411, and may perform one or more operations 417 to use the multicast service.

In some demonstrative embodiments, as shown in FIG. 4, devices 402 may transmit multicast data 418, which may be received by device 440.

Referring back to FIG. 1, in some demonstrative embodiments, when an NDP is setup, for example, between devices 102 and/or 140, e.g., for a unicast service, a NAN device, e.g., device 102 and/or device 140, may be required, for example, to maintain resources, such as, for example, scheduling awake slots for data communication, of the unicast service.

In some demonstrative embodiments, when setting up a multicast service, for example, between devices 102, 140, 160 and/or 180, for example, when a NAN device starts or enrolls to an NMSG, the NAN device may be required, for example, to maintain resources, such as, for example, scheduling awake slots, e.g., for data communication.

In some demonstrative embodiments, it may be possible that at least one of the NAN devices may be unavailable, or out of service, for example, due to mobility, device hardware error, e.g., out of battery, unexpected software error, e.g., if a user shuts down the service, and/or for one or more additional or alternative reasons.

In some demonstrative embodiments, it may be possible that a NAN device may want to terminate the service, for example, because the service is no longer required, e.g., if a printing service is no longer required by the NAN device, and/or for any other reason.

In some demonstrative embodiments, devices 102, 140, 160 and/or 180 may be configured to implement one or more operations of a termination procedure, for example, to enable and/or allow a NAN device to terminate a NAN service setup, e.g., for a unicast service and/or a multicast service, for example, to terminate the NMSG enrolment, e.g., as described below.

In some demonstrative embodiments, devices 102, 140, 160 and/or 180 may be configured to implement one or more operations of a termination procedure, for example, to enable a NAN device to terminate the NDP setup for a unicast service, e.g., as described below.

In some demonstrative embodiments, devices 102, 140, 160 and/or 180 may be configured to implement one or more operations of a termination procedure, for example, to enable a NAN device to terminate an NMSG enrolment for a multicast service, e.g., as described below.

In some demonstrative embodiments, allowing the NAN device to terminate the NDP setup and/or the NMSG enrolment may enable the NAN device, for example, at least to free one or more resources, which would otherwise be maintained by the NAN device for a unicast service and/or a multicast service.

In some demonstrative embodiments, devices 102, 140, 160 and/or 180 may be configured to perform one or more operations of a termination procedure, e.g., with respect to a unicast service and/or a multicast service, which may utilize an idle period, e.g., a maximal (Max) Idle Period, e.g., as described below.

In some demonstrative embodiments, the Max Idle Period may be determined by and/or announced by a NAN device participating in a NAN data path, e.g., as described below.

In some demonstrative embodiments, when establishing a NAN data path, a first NAN device, e.g., device 102, may operate in a role of a Publisher, and a second NAN device, e.g., device 140, may operate in a role of a Subscriber.

In one example, at least one of the devices, e.g., the Publisher, may be allowed to announce the Max Idle Period, during which the Publisher is to keep the data path without termination.

In another example, at least one of the devices, e.g., the Subscriber, may be allowed to announce the Max Idle Period for the Subscriber, for example, to keep the data path without termination.

In some demonstrative embodiments, either one or both publisher or subscriber may be allowed to announce the Max Idle Period, e.g., during the data path setup. For example, allowing both the publisher and the subscriber to announce the Max Idle Period may solve a technical problem, e.g., that each or both sides may lose track of the other side. Hence, the problem itself may be a two side problem, rather than a one side problem.

In some demonstrative embodiments, devices 102, 140, 160 and/or 180 may be configured to perform one or more operations of a termination procedure, e.g., with respect to a unicast service and/or a multicast service, which may utilize an activity timer, e.g., as described below.

In some demonstrative embodiments, an activity timer may be used, e.g., by the Subscriber, to track an activity of a unicast or a multicast service. For example, expiration of the activity timer may serve as an indication that the service should be terminated, e.g., as described below.

In some demonstrative embodiments, the activity timer may be used by the Subscriber to track an activity of a unicast service and/or a multicast service. For example, expiration of the activity timer may indicate that the service should be terminated.

In some demonstrative embodiments, the Subscriber may want to, and/or may be allowed to, transmit a Keep-alive frame, for example, before the activity timer expires, for example, to indicate that the service should not be terminated, e.g., as described below.

In some demonstrative embodiments, devices 102, 140, 160 and/or 180 may be configured to perform one or more operations of a termination procedure, e.g., with respect to a unicast service and/or a multicast service, which may utilize a termination frame, e.g., as described below.

In some demonstrative embodiments, a NAN device, e.g., device 102, may be configured to be allowed to send a termination frame to inform a peer NAN device, e.g., device 140, that a unicast or multicast service is to be terminated, e.g., as described below.

In some demonstrative embodiments, a termination procedure to terminate a multicast service may include a termination process, which may be configured for an enroller and/or an enrollee, for example, in the case that multiple enrollers exist in an NMSG ("many-to-many"), or only one enroller ("one-to-many") exists in an NMSG, e.g., as described below.

In some demonstrative embodiments, devices 102, 140, 160 and/or 180 may be configured to implement one or more operations of a termination procedure ("unicast termination") configured for a unicast service, e.g., as described below.

In some demonstrative embodiments, devices 102 and 140 may setup an NDP over an NDL for a unicast service.

In some demonstrative embodiments, both a Publisher and a Subscriber of the unicast service may be allowed to publish the Max Idle Period.

In some demonstrative embodiments, a device performing a role of the Publisher, e.g., device 102, may be configured to publish the Max Idle Period.

In some demonstrative embodiments, a device performing a role of the Subscriber, e.g., device 140, may be configured to publish the Max Idle Period.

In some demonstrative embodiments, the Max Idle Period may be included in an NDP attribute of a NDP response message. In other embodiments, the Max Idle Period may be included in any other additional or alternative attribute and/or message.

In some demonstrative embodiments, the Max Idle period may be included in an NDL attribute, e.g., as described below.

In some demonstrative embodiments, the Publisher, e.g., device 102, may be configured to terminate the NDP, for example, if the Publisher has not received any frame from the subscriber, e.g., device 140, within the announced Max Idle Period.

In some demonstrative embodiments, the subscriber, e.g., device 140, may be configured to terminate the NDP, for example, if the subscriber, e.g., device 140, has not received any frame from the publisher, e.g., device 102, within the announced Max Idle Period.

In some demonstrative embodiments, if the publisher, e.g., device 102, has not received any frame from the subscriber, e.g., device 140, in the announced Max Idle period, then the publisher may terminate all the NDPs established with the subscriber.

In some demonstrative embodiments, if the subscriber, e.g., device 140, has not received any frame from the publisher, e.g., device 102, in the announced Max Idle period, then the subscriber may terminate all the NDPs established with the publisher.

In some demonstrative embodiments, an activity timer (also referred to as a "termination timer") may be kept, for example, for each NAN device, e.g., for each NDL, to trace the activity over the NDL.

In some demonstrative embodiments, an activity timer may be kept, for example, for each NAN device, e.g., for each NDP, to trace the activity over the NDP.

For example, devices 102 and 140 may setup a unicast service over an NDP of an NDL, the NDL may include one or more other NDPs for one or more unicast services between devices 102 and 140. According to this example, devices 102 and/or 140 may keep an activity timer for an NDP, e.g., for each NDP, and/or an activity timer for the NDL.

In some demonstrative embodiments, the activity timer value may be set to be equal, for example, to the Max Idle Period, e.g., for the publisher or the subscriber e.g., device 102 or 140.

In some demonstrative embodiments, the subscriber e.g., device 140, may be allowed to announce an activity timer value of the subscriber, for example, in an NDP attribute of an NDP request message, and/or in any other attribute and/or message, e.g., as described below.

In some demonstrative embodiments, the activity timer maintained by a NAN device, e.g., device 102, may be reset by the NAN device, for example, if activity from any NDP of the NDL is observed, e.g., if the NAN device transmits to a peer NAN device, e.g., device 140, and/or receives from the other NAN device one or more messages, over the NDL. For example, the activity may include any transmission from the peer device.

In some demonstrative embodiments, when the activity timer expires, the NAN device, e.g., device 102, may be allowed to terminate the NDP. For example, the NAN device may send an NDP termination frame to inform a peer NAN device, e.g., device 140, that the NDP is terminated, e.g., as described below.

In some demonstrative embodiments, when the activity timer expires, the NAN device, e.g., device 102, may be allowed terminate the NDP, and may send a data path termination NAN Action Frame (NAF) with a corresponding NDP attribute to inform the peer device, e.g., device 140, that the NDP is to be terminated.

In some demonstrative embodiments, a NAN device, for example, each NAN device, e.g., device 102, may maintain a keep alive timer, e.g., for each NDL to trace the activity, e.g., as described below.

For example, device 102 may provide one or more unicast services to devices 140, 160 and/or 180 over one or more NDLs between device 102 and devices 140, 160 and/or 180. According to this example, device 102 may maintain a keep-alive timer for one or more of the NDLs, e.g., even for each NDL of the one or more NDLs.

In some demonstrative embodiments, for example, for the publisher, e.g., device 102, the keep-alive timer value may be equal to the announced Max Idle period from the subscriber, e.g., device 140.

In some demonstrative embodiments, for example, for the subscriber, e.g., device 140, the keep-alive timer value may be equal to the announced Max Idle period from the publisher, e.g., device 102.

In some demonstrative embodiments, a NAN device, e.g., device 140, may transmit a keep-alive frame to a peer device, e.g., device 102, before the keep-alive timer is expired, for example, to keep an NDL between devices 102 and 140 active, e.g., if there is no data packet to be communicated over the NDL.

In some demonstrative embodiments, the keep-alive frame can be any frame that includes the peer device, e.g., device 120, as an intended receiver.

In some demonstrative embodiments, the keep-alive frame may include a unicast data packet frame, and/or any other frame.

In some demonstrative embodiments, a device, e.g., device 102, that receives the keep-alive frame, e.g., from device 140, may reset its activity timer.

In some demonstrative embodiments, a device, e.g., device 140, that transmitted the keep-alive frame and received a corresponding ACK frame from the peer device, e.g., device 102, may reset its keep-alive timer.

In some demonstrative embodiments, a NAN Device, for example, a NAN2 device, e.g., device 140, may include the Max Idle Period field in the NDL attribute to indicate the time period during which a peer NAN device, for example a peer NAN2 device, e.g., device 102, can refrain from transmitting over the NDL without being terminated.

In some demonstrative embodiments, for example, if a NAN Device, for example, a NAN2 device, e.g., device 140, includes the Max Idle Period field in the NDL attribute, the NAN device, e.g., the NAN2 device, may be allowed to terminate all the NDPs over the NDL established with the peer NAN device, for example, a peer NAN2 device, e.g., device 102, if the NAN device has not received any frame from the peer NAN device for a time period greater than or equal to the time specified by the Max Idle Period field.

In some demonstrative embodiments, for example, devices 102 and 140 may setup an NDL between devices 102 and 140 and one or more NDPs over the NDL, for example, to provide one or more unicast services between devices 102 and 140.

In some demonstrative embodiments, device 102 may perform a role of a publisher of a unicast service of the one or more unicast services.

In some demonstrative embodiments, device 140 may perform a role of a subscriber of the unicast service.

In some demonstrative embodiments, devices 102 and/or 140 may be configured to transmit a message including an NDL attribute corresponding to an NDL between devices 102 and 140.

In some demonstrative embodiments, device 102 may be configured to transmit the message, e.g., as the publisher of the unicast service, e.g., as described below.

In some demonstrative embodiments, device 140 may be configured to transmit the message, e.g., as the subscriber of the unicast service, e.g., as described below.

In some demonstrative embodiments, the message, e.g., from device 140 to device 102, may include, a Data Path request, e.g., as described below.

In some demonstrative embodiments, controller 154 may be configured to control cause, and/or trigger device 140 to transmit a message including an NDL attribute corresponding to an NDL with device 102.

In some demonstrative embodiments, the NDL attribute may include a Maximal (Max) Idle Period field to indicate a time period during which device 102 is allowed to refrain from transmitting over the NDL without the NDL being terminated, e.g., by device 140.

In some demonstrative embodiments, controller 154 may be configured to control cause, and/or trigger device 140 to transmit the message, for example, during establishment of the NDP.

In some demonstrative embodiments, device 102 may receive the message including the max idle period from device 102, for example, during the establishment of the NDP.

In some demonstrative embodiments, device 102 may be allowed to refrain from transmitting over the NDL without the NDL being terminated, e.g., during the max idle period.

In some demonstrative embodiments, device 140 may be configured to select not to terminate the NDL during the max idle period.

In some demonstrative embodiments, controller 154 may be configured to allow device 140 to terminate all NDPs over the NDL, for example, if any frame is not received from the second NAN device, e.g., from device 102, for example, for at least the time period indicated by the Max Idle Period field in the message from device 140.

In some demonstrative embodiments, device 102, e.g., as the publisher of the unicast service, may be configured to transmit the message to device 140, for example, as the subscriber of the message, e.g., as described below.

In some demonstrative embodiments, the message, e.g., from device 102 to device 140, may include a Data Path response, e.g., as described below In some demonstrative embodiments, controller 124 may be configured to control cause, and/or trigger device 102 to transmit the message including the NDL attribute corresponding to the NDL with device 140.

In some demonstrative embodiments, the NDL attribute may include the Max Idle Period field to indicate a time period during which device 140 is allowed to refrain from transmitting over the NDL without the NDL being terminated, e.g., by device 102.

In some demonstrative embodiments, controller 124 may be configured to control cause, and/or trigger device 102 to transmit the message, for example, during establishment of an NDP.

In some demonstrative embodiments, device 140 may receive the message including the max idle period from device 102, for example, during the establishment of the NDP.

In some demonstrative embodiments, device 140 may be allowed to refrain from transmitting over the NDL without the NDL being terminated, e.g., during the max idle period.

In some demonstrative embodiments, device 102 may be configured to select not to terminate the NDL during the max idle period.

In some demonstrative embodiments, controller 124 may be configured to allow device 102 to terminate all NDPs over the NDL, for example, if any frame is not received from device 140, e.g., for at least the time period indicated by the Max Idle Period field in the message from device 102.

In some demonstrative embodiments, a device of devices 102, 140, 160, and/or 180 may be configured to keep an activity timer.

In some demonstrative embodiments, device 102, e.g., as the publisher of the unicast service, may be configured to keep an activity timer, for example, to trace an activity over the NDL, e.g., as described below.

In some demonstrative embodiments, device 140, e.g., as the subscriber of the unicast service, may be configured to keep an activity timer, for example, to trace an activity over the NDL, e.g., as described below.

In some demonstrative embodiments, controller 154 may be configured to control cause, and/or trigger device 140 to update an activity timer, for example, based on detected activity over at least one NDP over the NDL.

In some demonstrative embodiments, controller 154 may be configured to control cause, and/or trigger device 140 to allow device 140 to terminate the NDL, for example, based on expiration of the activity timer.

In some demonstrative embodiments, device 102 may be configured to transmit a keep-alive frame to device 140, for example, to indicate to device 140 that the NDPs over the NDL are not to be terminated.

In some demonstrative embodiments, device 102 may be configured to maintain a keep-alive timer, for example, to count a time period to send a keep-alive frame to device 140, e.g., as described below.

In some demonstrative embodiments, controller 124 may be configured to control cause, and/or trigger device 102 to transmit the keep-alive frame prior to expiration of the keep alive timer of device 102, for example, to indicate that the NDP is not to be terminated, e.g., by device 140.

In some demonstrative embodiments, device 140 may receive the keep-alive message from device 102.

In some demonstrative embodiments, controller 154 may be configured to control cause, and/or trigger device 140 to update the activity timer of device 140, for example, based on a keep-alive frame from device 102, that indicates that the NDPs over the NDL are not to be terminated. For example, device 154 may reset the activity timer to its initial value, for example, upon receiving the keep alive frame from device 102.

In some demonstrative embodiments, device 102, e.g., as the publisher of the unicast service, may be configured to keep an activity timer, for example, to trace an activity over the NDL, e.g., as described below.

In some demonstrative embodiments, controller 124 may be configured to control cause, and/or trigger device 102 to update the activity timer of device 102, for example, based on detected activity over at least one NDP over the NDL.

In some demonstrative embodiments, controller 124 may be configured to control cause, and/or trigger device 102 to allow device 102 to terminate the NDL, for example, based on expiration of the activity timer of device 102.

In some demonstrative embodiments, device 140 may be configured to transmit a keep-alive frame to device 102, for example, to indicate to device 102 that the NDPs over the NDL are not to be terminated.

In some demonstrative embodiments, device 140 may be configured to maintain a keep-alive timer, for example, to count a time period to send a keep-alive frame to device 102, e.g., as described below.

In some demonstrative embodiments, controller 154 may be configured to control cause, and/or trigger device 140 to transmit the keep-alive frame prior to expiration of the keep alive timer of device 140, for example, to indicate that the NDP is not to be terminated, e.g., by device 102.

In some demonstrative embodiments, device 102 may receive the keep-alive message from device 140.

In some demonstrative embodiments, controller 124 may be configured to control cause, and/or trigger device 102 to update the activity timer of device 102, for example, based on the keep-alive frame from device 140, that indicates that the NDPs over the NDL are not to be terminated. For example, device 124 may reset the activity timer of device 102 to its initial value, for example, upon receiving the keep-alive frame from device 140.

In some demonstrative embodiments, devices 102, 140, 160 and/or 180 may be configured to perform one or more operations of a termination procedure, e.g., with respect to the unicast service, which may utilize a termination frame, e.g., as described below.

In some demonstrative embodiments, a first device of devices 102, 140, 160 and/or 180, e.g., device 102, may be configured to set up a NAN service path with at least one second NAN device of devices 102, 140, 160 and/or 180, e.g., device 140.

In some demonstrative embodiments, the NAN service path may include an NDP of a unicast service between devices 102 and 140.

In some demonstrative embodiments, the NDP may be over an NDL between the devices 102 and 140.

In some demonstrative embodiments, a first device of devices 102, 140, 160 and/or 180, may be configured to transmit a termination frame to the second NAN device of devices 102, 140, 160 and/or 180, for example, to terminate a participation of the first device in the NDP.

In some demonstrative embodiments, the termination frame may be configured to indicate that NDPs over the NDL between devices 102 and 140 are to be terminated.

In some demonstrative embodiments, the termination frame may include a NAN action frame (NAF) including a data path termination subtype field, e.g., as described below.

In some demonstrative embodiments, the termination frame may include an NDP attribute, e.g., as described below.

In some demonstrative embodiments, the NDP attribute may include a type field including a value to indicate termination.

In some demonstrative embodiments, device 102 may perform the functionality of the publisher of the NDP, and/or device 104 may perform the functionality of the subscriber of the NDP.

In some demonstrative embodiments, device 102 as the publisher of the NDP may be configured to transmit the termination frame to device 140 as the subscriber of the NDP, for example, to terminate a participation of the publisher, e.g., device 102, in the NDP, e.g., as described below.

In some demonstrative embodiments, device 102 may terminate the NDL, for example, when all the NDPs over the NDL are terminated.

In some demonstrative embodiments, controller 124 may be configured to control cause, and/or trigger device 102 to determine the NDL is to be terminated, for example, when all the NDPs over the NDL are terminated.

In some demonstrative embodiments, device 140 as the subscriber of the NDP may be configured to transmit the termination frame to device 102 as the publisher of the NDP, for example, to terminate a participation of the subscriber, e.g., device 140, in the NDP, e.g., as described below.

In some demonstrative embodiments, device 140 may terminate the NDL, for example, when all the NDPs over the NDL are terminated.

In some demonstrative embodiments, controller 154 may be configured to control cause, and/or trigger device 140 to determine the NDL is to be terminated, for example, when all the NDPs over the NDL are terminated.

In some demonstrative embodiments, device 140 may be configured to be allowed to terminate the NDPs over the NDL, for example, before expiration of the activity timer of device 140, e.g., as described below.

In some demonstrative embodiments, device 102 may be configured to be allowed to terminate the NDPs over the NDL, for example, before expiration of the activity timer of device 102, e.g., as described below.

In some demonstrative embodiments, a NAN device, e.g., device 102, may be allowed to send a termination frame before the activity timer is expired, for example, to inform a peer device, e.g., device 140 that an NDP over the NDL is to be terminated, e.g., for any reason.

In some demonstrative embodiments, a NAN device, e.g., device 102, may be allowed to send a data path termination NAF with a corresponding NDP attribute, for example, before the activity timer is expired, for example, to inform the peer device, e.g., device 140, that the NDP is to be terminated.

In some demonstrative embodiments, a NAN device, e.g., device 140, may be configured to terminate an NDP, for example, if a termination frame for the NDP is received by the NAN device, e.g., from a peer device, e.g., device 102.

In some demonstrative embodiments, a NAN device, e.g., device 102, may be configured to terminate an NDP, for example, if a termination frame for the NDP is transmitted from the NAN device to the peer device, e.g., device 140.

In some demonstrative embodiments, devices 102, 140, 160 and/or 180 may be configured to implement one or more operations of a termination procedure, which may utilize a termination frame, for example, to enable a NAN device to terminate an NMSG enrolment for multicast service, e.g., as described below.

In some demonstrative embodiments, devices 102, 140, 160 and/or 180 may be configured to implement the termination process using a termination frame, which may be configured for an enroller and/or an enrollee, for example, in the case that multiple enrollers exist in an NMSG ("many-to-many"), or only one enroller (one-to-many) exists in an NMSG, e.g., as described below.

In some demonstrative embodiments, a first device of devices 102, 140, 160 and/or 180 may be configured to set up a NAN service path with at least one second NAN device of devices 102, 140, 160 and/or 180.

In some demonstrative embodiments, the NAN service path may include an NMSG.

In some demonstrative embodiments, the first NAN device may include an enroller of the NMSG.

In one example, device 102 may perform the functionality of the enroller of the NMSG.

In some demonstrative embodiments, the NMSG may include a one-to-many NMSG.

In some demonstrative embodiments, the first NAN device may include a single enroller of the NMSG.

In one example, device 102 may perform the functionality of the single enroller of the one-to-many NMSG, and/or devices 140, 160 and/or 180 may perform the functionality of the enrollees of the one-to-many NMSG.

In some demonstrative embodiments, the NMSG may include a many-to-many NMSG including a plurality of enrollers.

In some demonstrative embodiments, the first NAN device may include an enroller of the plurality of enrollers.

In one example, devices 102 and 160 may perform the functionality of the plurality of enrollers, and/or devices 140 and 180 may perform the functionality of the enrollees.

In some demonstrative embodiments, a first device of devices 102, 140, 160 and/or 180 may be configured to transmit a termination frame to a second NAN device of devices 102, 140, 160 and/or 180, for example, to terminate a participation of the first device in the NMSG.

In some demonstrative embodiments, an enroller, e.g., device 102, of the NMSG may be configured to send the termination frame, for example, to terminate the participation of the enroller in the NMSG, e.g., as described below.

In some demonstrative embodiments, controller 124 may be configured to control cause, and/or trigger device 102 to transmit a termination frame to terminate a participation of device 102 in the NMSG.

In some demonstrative embodiments, the termination frame may include a NAN action frame (NAF) including a data path termination subtype field, e.g., as described below.

In some demonstrative embodiments, the termination frame may include an NMSG attribute.

In some demonstrative embodiments, the NMSG attribute may include a type field including a value to indicate termination, e.g., as described below.

In some demonstrative embodiments, the NMSG attribute may include an NMSG Identifier (ID) corresponding to the NMSG, e.g., as described below.

In some demonstrative embodiments, the termination frame may include a NAN availability attribute.

In some demonstrative embodiments, devices 102, 140, 160 and/or 180 may be configured to implement one or more operations of a termination procedure ("multicast termination") configured for a multicast service, for example, in addition to and/or instead of utilizing a termination frame, e.g., as described below.

In some demonstrative embodiments, devices 102, 140, 160 and/or 180 may be configured to implement one or more operations of a termination procedure ("multicast enroller termination") configured for an enroller, e.g., device 102, of a multicast service, e.g., as described below.

In some demonstrative embodiments, devices 102, 140, 160 and/or 180 may be configured to implement one or more operations of a termination procedure ("multicast enrollee termination") configured for an enrollee of a multicast service, e.g., as described below.

In some demonstrative embodiments, one or more separate termination procedures and/or operations may be configured for the enroller and the enrollee, e.g., as described below.

In some demonstrative embodiments, the multicast enroller termination procedure and/or the multicast enrollee termination procedure may be configured for a case when there is only one enroller (one-to-many), and/or for a case where there are multiple enrollers (many-to-many), e.g., as described below.

In some demonstrative embodiments, device 102 may perform the functionality of an enroller, e.g., in the one-to-many case and/or in the many-to-many case, e.g., as described below.

In some demonstrative embodiments, device 140 may perform the functionality of an enrollee, e.g., in the one-to-many case and/or in the many-to-many case, e.g., as described below.

In some demonstrative embodiments, according to a multicast enrollee termination procedure, for example, for an enrollee, in a one-to-many case, a timer may be kept by a NAN device, for example, for each NMSG, e.g., to trace the activity over the NMSG.

In some demonstrative embodiments, the NAN device may reset the timer, for example, if activity from the NMSG is observed.

In some demonstrative embodiments, when the timer expires, the enrollee, e.g., device 140, may terminate the NMSG, and may send a termination frame to inform the enroller, e.g., device 102, that the enrollee, e.g., device 140, is to terminate participation of the enrollee in the NMSG, for example, if explicit enrollment is used by the enrollee.

In some demonstrative embodiments, when the timer expires, the enrollee, e.g., device 140, may terminate participation of the enrollee in the NMSG, e.g., even without sending a termination frame to the enroller, for example, if implicit enrollment is used by the enrollee, e.g., device 140.

In some demonstrative embodiments, a timer equal to the Max Idle Period may be kept by the enroller, e.g., device 102, and/or the enrollee, e.g., device 140.

In some demonstrative embodiments, an NMSG enroller, e.g., device 102, and/or an NMSG enrollee, e.g., device 140, may transmit a keep-alive frame before the keep-alive timer is expired, for example, to keep the NMSG active, e.g., if there is no data packet communicated in the NMSG.

In some demonstrative embodiments, the keep-alive frame may be a multicast data packet frame, and/or any other frame.

In some demonstrative embodiments, an Enrollee, e.g., device 140, that receives the keep-alive frame may reset its timer.

In some demonstrative embodiments, the enroller, e.g., device 140, may be allowed to send the termination frame before the timer is expired, for example, to inform the enroller, e.g., device 102, in the NMSG that the enrollee, e.g., device 140, is to terminate participation of the enrollee in the NMSG, e.g., if explicit enrollment is used.

In some demonstrative embodiments, the enrollee, e.g., device 140, may be allowed to terminate participation of the enrollee in the NMSG, for example, if a termination frame is received from the enroller, e.g., device 102.

In some demonstrative embodiments, according to a multicast enroller termination procedure, for example, for an enroller in a one-to-many case, an NMSG enroller, e.g., device 102, may operate in a role of a publisher, and may publish the Max Idle Period.

In some demonstrative embodiments, the Max Idle period may be included in an NMSG attribute of an NMSG response message or publish message, and/or in any other attribute and/or message.

In some demonstrative embodiments, the enroller, e.g., device 102, may remove the enrollee, e.g., device 140, from the NMSG, and/or may terminate the NMSG, for example, if the enroller, e.g., device 102, has not received any frame from the enrollee, e.g., device 140, during the Max Idle period.

In some demonstrative embodiments, a timer equal to the Max Idle Period may be kept by the enroller, e.g., device 102, and/or the enrollee, e.g., device 140.

In some demonstrative embodiments, the enroller, e.g., device 102, may send a data path termination frame, for example, with an NMSG attribute, to terminate an NMSG, for example, if the enroller wants to terminate the NMSG.

In some demonstrative embodiments, an NMSG enroller, e.g., device 102, and/or an NMSG enrollee, e.g., device 140, may transmit a keep-alive frame before the keep-alive timer is expired, for example, to keep the NMSG active, e.g., if there is no data packet communicated during the max idle period.

In some demonstrative embodiments, the keep-alive frame may be a multicast data packet frame and/or any other frame.

In some demonstrative embodiments, the enroller, e.g., device 102, may not be required to keep, e.g., does not keep, a timer for the NMSG, for example, because the enroller may be the sole controller in a one-to-many case, and, accordingly, the enroller may simply terminate the NMSG when the enroller wants to terminate the NMSG, e.g., based on any suitable criteria.

In some demonstrative embodiments, the enroller, e.g., device 102, may terminate the NMSG, for example, if a termination frame is received from the enrollee, e.g., device 140.

In some demonstrative embodiments, according to a multicast enrollee termination procedure, for example, for an enrollee, in a many-to-many case, an activity timer may be kept by the enrollee, e.g., device 140, for example, for each NMSG, e.g., to trace the activity in the NMSG.

In some demonstrative embodiments, the activity timer may be reset by the enrollee, for example, if activity from the NMSG is observed.

In some demonstrative embodiments, when the activity timer expires, the enrollee, e.g., device 140, may terminate the NMSG, and may send a termination frame to inform neighboring enrollers, e.g., device 180, that the enrollee, e.g., device 140, terminates the NMSG, for example, if explicit enrollment is used by the enrollee.

In some demonstrative embodiments, when the activity timer expires, the enrollee, e.g., device 140, may simply terminate the participation of the enrollee in the NMSG, for example, even without sending a termination frame, for example, if implicit enrollment is used by the enrollee.

In some demonstrative embodiments, a keep-alive timer equal to the Max Idle Period may be kept by the enroller, e.g., device 102, and/or the enrollee, e.g., device 140.

In some demonstrative embodiments, an NMSG enroller, e.g., device 102, and/or an NMSG enrollee, e.g., device 140, may transmit a keep-alive frame before the keep-alive timer expires, for example, to keep the NMSG active, e.g., if there is no data packet during the Max Idle Period.

In some demonstrative embodiments, the keep-alive frame may be a multicast data packet frame, or any other frame.

In some demonstrative embodiments, an enrollee, e.g., device 140, that receives the keep-alive frame may reset its activity timer.

In some demonstrative embodiments, the enrollee, e.g., device 140, may be allowed to send a termination frame before the timer is expired, for example, to inform the neighboring enrollers, e.g., device 180, in the NMSG that the enrollee, e.g., device 140, is terminating participation of the enrollee in the NMSG, e.g., if explicit enrollment is used.

In some demonstrative embodiments, the enrollee, e.g., device 140, may terminate the NMSG, for example, if a termination frame is received from a neighboring enroller, e.g., device 160.

For example, the enrollee, e.g., device 140, may be allowed to determine and/or select whether or not to terminate participation of the enrollee in the NMSG upon receipt of a termination frame from the neighboring enroller, for example, as the enrollee, e.g., device 140, may still see other neighboring enrollers in the NMSG, e.g., device 140 may still see device 102 as an enroller.

In some demonstrative embodiments, according to a multicast enroller termination procedure, for example, for an enroller in a many-to-many case, an NMSG enroller, e.g., device 102, for example, performing a role of a publisher, may publish the Max Idle period.

In some demonstrative embodiments, the Max Idle period may be included in an NMSG attribute of an NMSG response message or a publish message, and/or any other attribute and/or message.

In some demonstrative embodiments, for example, if the enroller, e.g., device 102, has not received any frame from the enrollee, e.g., device 140, during the Max Idle period, the enroller, e.g., device 102, may remove the enrollee, e.g., device 140, from the NMSG, or may terminate the NMS G.

In some demonstrative embodiments, a timer equal to the Max Idle Period may be kept by the enroller, e.g., device 102, and/or the enrollee, e.g., device 140.

In some demonstrative embodiments, the enroller, e.g., device 102, of the NMSG may be configured to send a termination frame, and to terminate the NMSG, for example, if the enroller, e.g., device 102, wants to terminate the NMSG.

In some demonstrative embodiments, an NMSG enroller, e.g., device 102, and/or an NMSG enrollee, e.g., device 140, may transmit a keep-alive frame before the timer expires, for example, to keep the NMSG active, e.g., if there is no data packet to transmit. The keep-alive frame may be a multicast data packet frame, or any other frame.

In some demonstrative embodiments, the enroller, e.g., device 102, may not be required to keep, e.g., does not keep, a timer for the NMSG, for example, because the enroller, e.g., device 102, may be capable of functioning as an enroller, e.g., independent of other neighboring enrollers, and/or any enrollee, e.g., device 140, in an NMSG.

In some demonstrative embodiments, the enroller, e.g., device 102, may terminate the NMSG, for example, if a termination frame is received from the enrollee, and/or one or more neighboring enrollers.

In some demonstrative embodiments, devices 102, 140, 160 and/or 180 may be configured to generate, transmit, receive, and/or process a termination frame having a frame format, e.g., as described below.

In some demonstrative embodiments, the termination frame may include a NAN action frame. For example, a subtype for data path termination may be added in the NAN action frame.

In some demonstrative embodiments, the termination frame may include one or more of the following fields:

TABLE 1

| Field | Size (octets) | Value (Hexadecimal) | Description |
| --- | --- | --- | --- |
| Category | 1 | 0x04 or 0x09 | IEEE 802.11 Public Action Frame or IEEE 802.11 Protected Dual of Public Action frame. |
| Action Field | 1 | 0x09 | IEEE 802.11 Public Action Frame Vendor Specific or Protected Vendor Specific. |
| OUI | 3 | 0x50-6F-9A | Wi-Fi Alliance specific OUI |
| OUI Type | 1 | TBD | Identifying the type and version of the NAN2 |
| OUI Subtype | 1 | Variable | Identifying the type of NAN2 action frame. The specific values are defined in Table 5-x2. |
| Information Content | Variable | Variable | Including fields and/or attributes for each specific NAN2 action frames, as defined in the following sections. |

In other embodiments, a termination frame may include some or all of the fields of Table 1, and/or may include one or more additional or alternative fields and/or elements, e.g., in addition to or instead of one or more of the fields or elements of Table 1.

In some demonstrative embodiments, the OUI Subtype field of Table 1 may include one or more of the following fields:

TABLE 2

| OUI Subtype | Notes |
| --- | --- |
| 0 | Reserved. |
| 1 | Ranging Request |
| 2 | Ranging Response |
| 3 | Ranging Report |
| 4 | Data Path Request |
| 5 | Data Path Response |
| 6 | Data Path Confirm |
| 7 | Data Path Key Installment |
| 8 | Schedule Request |
| 9 | Schedule Response |
| 10 | Schedule Confirm |
| 11 | Schedule Update Notification |
| 12 | Data Path Termination |
| 12-255 | Reserved |

In other embodiments, the OUI Subtype field of Table 1 may include some or all of the fields of Table 2, and/or may include one or more additional or alternative fields and/or elements, e.g., in addition to or instead of one or more of the fields or elements of Table 2.

In some demonstrative embodiments, an NDP attribute may be included in a termination frame, for example, if the termination is to be implemented for a unicast service.

In some demonstrative embodiments, a Type field of the NDP attribute may be configured to indicate termination.

In some demonstrative embodiments, the NDP attribute may include one or more of the following fields:

TABLE 3

| Field | Size (octets) | Value | Description |
|---|---|---|---|
| Attribute ID | 1 | TBD | Identifies the type of NAN attribute. |
| Length | 2 | Variable | Length of the following fields in the attribute. |
| Dialog Token | 1 | Variable | Set to a nonzero value to identify the request and response transaction. |
| Type and Status | 1 | Variable | Bit 0 to Bit 3: Type subfield. The Type subfield identifies the type of the attribute. The values are defined as follows:<br>  0: Request<br>  1: Response<br>  2: Confirm<br>  3: Security Install<br>  4: Termination<br>  5 to 15: Reserved<br>Bit 4 to Bit 7: Status subfield. The Status subfield identifies status if the Type subfield is set to "Response". Otherwise, the Status subfield is reserved. The values are defined as follows:<br>  0: Accepted<br>  1: Rejected<br>  2 to 15: Reserved |
| Reason Code | 1 | Variable | Identifies the reject reason when the Type subfield is to "Response" and the Status subfield is to "Rejected". This field is reserved when the Type subfield is set to "Request". The values of Reason Code are defined in Table x-2.1. |
| Publish ID | 1 | Variable | Instance ID of the service (received in publish message) |
| Initiator NDI | 6 | Variable | NDP Initiator's Data Interface Address |
| NDP ID | 1 | 1-255 | NDP Identifier (created by the initiator) |
| Responder NDI | 6 | Variable | Optional field. Present only if Type subfield is set to 1, and the Status subfield is set to 0. NDP Responder's Data Interface Address |
| NDP Control | 1 | Variable | To indicate presence or absence of fields |
| NDP Specific Info | Var | Variable | Information that is opaquely carried through the NAN |
| Max Idle Period | 2 | Variable | Indicate the value Maximum Idle Period |

In other embodiments, the NDP attribute may include some or all of the fields of Table 3, and/or may include one or more additional or alternative fields and/or elements, e.g., in addition to or instead of one or more of the fields or elements of Table 3.

In some demonstrative embodiments, as shown in Table 3 the NDP attribute may include a type and status field including a Termination indication, and/or a value indicating the Max idle period in a MAX idle period field.

In some demonstrative embodiments, the NDP control field of Table 3 may include one or more of the following fields:

TABLE 4

| | Confirm Required | Responder Paused | Security Present | NDP Specific Info | Max Idle Period Present | Reserved |
|---|---|---|---|---|---|---|
| Bits | 1 | 1 | 1 | 1 | 1 | 3 |

In other embodiments, the NDP control field may include some or all of the fields of Table 4, and/or may include one or more additional or alternative fields and/or elements, e.g., in addition to or instead of one or more of the fields or elements of Table 4.

In some demonstrative embodiments, as shown in Table 4 the NDP control field may indicate a presence of the Max idle period value in the NDP attribute.

In some demonstrative embodiments, an NMSG attribute may be included in a termination frame, for example, if the termination is for a multicast service. For example, a NAN device, e.g., device 102, device 140, device 160, and/or device 180, may be configured to include the NMSG attribute in a termination frame, for example, to indicate a multicast service or a participation in the multicast service is to be terminated by the NAN device.

In some demonstrative embodiments, a type field of NMSG attribute may be configured to indicate termination.

In some demonstrative embodiments, the NMSG attribute may include one or more of the following fields:

TABLE 5

| Field | Size (octets) | Value | Description |
|---|---|---|---|
| Attribute ID | 1 | TBD | Identifies the type of NAN attribute. |
| Length | 2 | Variable | Length of the following fields in the attribute. |

TABLE 5-continued

| Field | Size (octets) | Value | Description |
|---|---|---|---|
| Dialog Token | 1 | Variable | Set to a nonzero value to identify the request and response transaction. |
| Type and Status | 1 | Variable | Bit 0 to Bit 3: Type subfield. The Type subfield identifies the type of the attribute. The values are defined as follows:<br>0: Request<br>1: Response<br>2: Implicit Enroll<br>3: Terminate<br>4 to 15: Reserved<br>Bit 4 to Bit 7: Status subfield. The Status subfield identifies status if the Type subfield is set to "Response". Otherwise, the Status subfield is reserved. The values are defined as follows:<br>0: Accepted<br>1: Rejected<br>2 to 15: Reserved |
| Reason Code | 1 | Variable | Identifies the reject reason when the Type subfield is to "Response" and the Status subfield is to "Rejected". This field is reserved when the Type subfield is set to "Request". The values of Reason Code are defined in Table x-2.1. |
| Publish ID | 6 | Variable | Instance ID of service received in Publish message |
| Data Interface Address | 6 | Variable | Set to NAN Management Address if the type is request<br>Set to NAN Data Interface Address associated with the multicast address if type is response |
| MC ID | 1 | Variable | Multicast ID to identify the request |
| Control | 2 | Variable | To indicate presence or absence of fields |
| Max Idle Period | 2 | Variable | Indicate the value of Max Idle Period |
| NMSG ID | TBD | Variable | NMSG ID |
| NMSG-MA | 6 | Variable | Multicast Address for data traffic |
| NMSG Specific Info | Var | Variable | Information that is opaquely carried through the NAN/Data Engine |

In other embodiments, the NMSG attribute may include some or all of the fields of Table 5, and/or may include one or more additional or alternative fields and/or elements, e.g., in addition to or instead of one or more of the fields or elements of Table 5.

In some demonstrative embodiments, as shown in Table 5 the NMSG attribute may include a value indicating the Max idle period in a MAX idle period field.

In some demonstrative embodiments, the NMSG control field of Table 5 may include one or more of the following fields:

TABLE 6

| NMSG ID Present | Security Present | Many to Many | NMSG Specific Info | NMSG-MA Present | Max Idle Period Present | Reserved |
|---|---|---|---|---|---|---|
| Bits | 1 | 1 | 1 | 1 | 1 | 10 |

In other embodiments, the NMSG control field may include some or all of the fields of Table 6, and/or may include one or more additional or alternative fields and/or elements, e.g., in addition to or instead of one or more of the fields or elements of Table 6.

In some demonstrative embodiments, as shown in Table 6 the NMSG control field may indicate a presence of the Max idle period value in the NMSG attribute.

In some demonstrative embodiments, a NAN Availability attribute may be included in the Termination frame, e.g., for resource updates.

In some demonstrative embodiments, devices 102, 140, 160 and/or 180 may be configured to generate, transmit, receive, and/or process a message including the Max Idle Period, for example, in an NDL attribute, e.g., as described above.

For example, the NDL attribute may include one or more of the following fields:

TABLE 7

| Field | Size (octets) | Value | Description |
|---|---|---|---|
| Attribute ID | 1 | 0x14 | Identifies the type of NAN attribute. |
| Length | 2 | Variable | Length of the following fields in the attribute. |
| Dialog Token | 1 | Variable | Set to a nonzero value to identify the request and response transaction. |
| Type and Status | 1 | Variable | Bit 0 to Bit 3: Type subfield. The Type subfield identifies the type of the attribute. The values are defined as follows:<br>0: Request<br>1: Response<br>2: Confirm<br>3 to 15: Reserved<br>Bit 4 to Bit 7: Status subfield. The Status subfield identifies the status of the operation associated with the attribute. The values of the Status subfield are defined as follows:<br>0: Continued<br>1: Accepted<br>2: Rejected<br>3 to 15: Reserved<br>The relationship between the Type subfield and the Status subfield is specified in Table xx. |

TABLE 7-continued

| Field | Size (octets) | Value | Description |
|---|---|---|---|
| Reason Code | 1 | Variable | Identifies the reason when the Status subfield is set to "Rejected". This field is reserved when the Status subfield is set to other values. The values of Reason Code are defined in Table x-2.1. |
| NDL Control | 1 | Variable | See Table xx for details |
| NDL Peer ID | 1 | Variable | Optional field. An identifier assigned to the peer STA of the NDL (to be used for paging if required) |
| Max Idle Period | 2 | Variable | Optional field. Indicate a period of time in units of 1024TU during which the peer NAN2 device can refrain from transmitting over the NDL without being terminated. |

In other embodiments, the NDL attribute may include some or all of the fields of Table 7, and/or may include one or more additional or alternative fields and/or elements, e.g., in addition to or instead of one or more of the fields or elements of Table 7.

In some demonstrative embodiments, as shown in Table 7 the NDL attribute may include a value indicating the Max idle period in a MAX idle period field.

In some demonstrative embodiments, the NDL control field of Table 7 may include one or more of the following fields:

TABLE 8

| Field | Size (bits) | Description | Field |
|---|---|---|---|
| NDL Peer ID Present | 1 | 1: Indicates the NDL Peer ID field is included in the NDL attribute; 0: otherwise | NDL Peer ID Present |
| Immutable Schedule Present | 1 | 1: Indicates the Immutable Schedule field is included in the NDL attribute; 0: otherwise | Immutable Schedule Present |
| NDC Attribute Present | 1 | 1: Indicates the NDC attribute associated with the NDL schedule is included in the same frame that carries the NDL attribute; 0: otherwise | NDC Attribute Present |
| NDL QoS Attribute Present | 1 | 1: Indicates the NDL QoS attribute associated with the NDL schedule is included in the same frame that carries the NDL attribute; 0: otherwise | NDL QoS Attribute Present |
| Max Idle Period Present | 1 | 1: Indicates the Max Idle Period field is included in the NDL attribute; 0: otherwise | Max Idle Period Present |
| Paging | 1 | 1: Indicates paging request/response or confirm 0: Indicates no paging for NDL | Paging |
| Reserved | 2 | Reserved for future use | Reserved |

In other embodiments, the NDL control field may include some or all of the fields of Table 8, and/or may include one or more additional or alternative fields and/or elements, e.g., in addition to or instead of one or more of the fields or elements of Table 8.

In some demonstrative embodiments, as shown in Table 8 the NDL control field may indicate a presence of the Max idle period value in the NDL attribute.

Reference is made to FIG. 5, which schematically illustrates a method of terminating NAN path, in accordance with some demonstrative embodiments. For example, one or more of the operation of FIG. 5 may be performed by one or more elements of a system, system 100 (FIG. 1); a device, e.g., wireless communication devices 102, 160, 180 and/or 140 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 502, the method may include transmitting a message including a NDL attribute corresponding to an NDL with a second NAN device, the NDL attribute including a Max Idle Period field to indicate a time period during which the second NAN device is allowed to refrain from transmitting over the NDL without the NDL being terminated. For example, controller 124 (FIG. 1) may control cause and/or trigger device 102 (FIG. 1) to transmit the message including the NDL attribute including the Max Idle Period field to indicate the time period during which device 140 (FIG. 1) is allowed to refrain from transmitting over the NDL without the NDL being terminated; and/or controller 154 (FIG. 1) may control cause and/or trigger device 140 (FIG. 1) to transmit the message including the NDL attribute including the Max Idle Period field to indicate the time period during which device 102 (FIG. 1) is allowed to refrain from transmitting over the NDL without the NDL being terminated, e.g., as described above.

As indicated at block 504, the method may include allowing the first NAN device to terminate all NDPs over the NDL, if any frame is not received from the second NAN device for at least the time period indicated by the Max Idle Period field. For example, controller 124 (FIG. 1) may allow device 102 (FIG. 1) to terminate all NDPs over the NDL, if any frame is not received from device 140 (FIG. 1) for at least the time period indicated by the Max Idle Period field in the message from device 102 (FIG. 1); and/or controller 154 (FIG. 1) may allow device 140 (FIG. 1) to terminate all NDPs over the NDL, if any frame is not received from device 102 (FIG. 1) for at least the time period indicated by the Max Idle Period field in the message from device 140 (FIG. 1), e.g., as described above.

Figure 6:
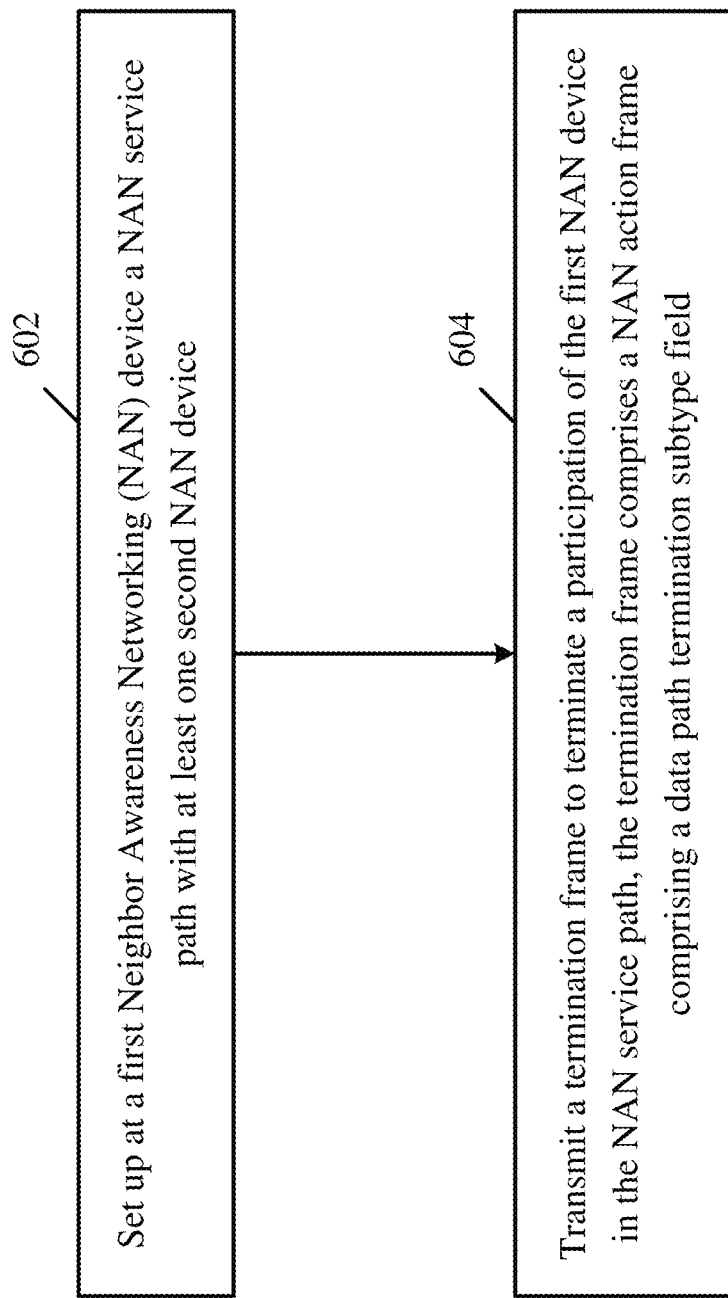
FIG. 6 is a schematic flow-chart illustration of a method of terminating a NAN Path, in accordance with some demonstrative embodiments.

Reference is made to FIG. 6, which schematically illustrates a method of terminating a NAN path, in accordance with some demonstrative embodiments. For example, one or more of the operation of FIG. 6 may be performed by one or more elements of a system, system 100 (FIG. 1); a device, e.g., wireless communication devices 102, 160, 180 and/or 140 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 602, the method may include setting up a NAN service path with at least one second NAN device. For example, controller 154 (FIG. 1) may control, cause and/or trigger device 140 (FIG. 1) setup a NAN service path with device 102 (FIG. 1); and/or controller 124 (FIG. 1) may control, cause and/or trigger device 102 (FIG. 1) setup a NAN service path with device 140 (FIG. 1), e.g., as described above.

Figure 7:
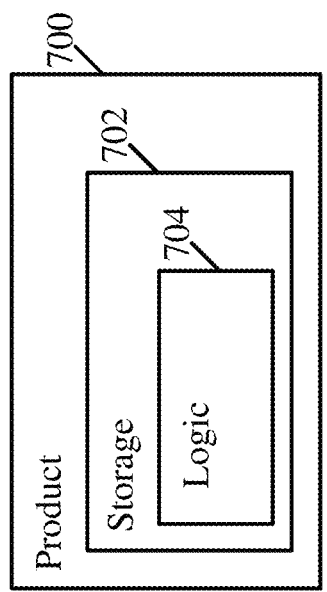
FIG. 7 is a schematic illustration of a product, in accordance with some demonstrative embodiments.

As indicated at block 602, the method may include transmitting a termination frame to terminate a participation of the first NAN device in the NAN service path, the termination frame includes a NAN action frame including a data path termination subtype field. For example, controller 154 (FIG. 1) may control, cause and/or trigger device 140 (FIG. 1) to transmit the termination frame including the NAN action frame including the data path termination subtype field, for example, to terminate the participation of device 140 (FIG. 1) in the NAN service path; and/or controller 124 (FIG. 1) may control, cause and/or trigger device 102 (FIG. 1) to transmit the termination frame including the NAN action frame including the data path termination subtype field, for example, to terminate the participation of device 102 (FIG. 1) in the NAN service path, e.g., as described above Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at devices 102, 140, 160 and/or 180 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause devices 102, 140, 160 and/or 180 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first Neighbor Awareness Networking (NAN) device to transmit a message comprising a NAN Data Link (NDL) attribute corresponding to an NDL with a second NAN device, the NDL attribute comprising a Maximal (Max) Idle Period field to indicate a time period during which the second NAN device is allowed to refrain from transmitting over the NDL without the NDL being terminated; and allow the first NAN device to terminate all NAN Data Paths (NDPs) over the NDL, if any frame is not received from the second NAN device for at least the time period indicated by the Max Idle Period field.

Example 2 includes the subject matter of Example 1, and optionally, wherein the apparatus is configured to cause the first NAN device to transmit the message during establishment of an NDP.

Example 3 includes the subject matter of Example 2, and optionally, wherein the message comprises a Data Path request.

Example 4 includes the subject matter of Example 2, and optionally, wherein the message comprises a Data Path response.

Example 5 includes the subject matter of any one of Examples 1-4, and optionally, wherein the apparatus is configured to cause the first NAN device to transmit a termination frame to the second NAN device, the termination frame to indicate that the NDPs over the NDL with the second NAN device are to be terminated.

Example 6 includes the subject matter of Example 5, and optionally, wherein the termination frame comprises a NAN action frame comprising a data path termination subtype field.

Example 7 includes the subject matter of Example 5 or 6, and optionally, wherein the termination frame comprises an NDP attribute, the NDP attribute comprising a type field comprising a value to indicate termination.

Example 8 includes the subject matter of any one of Examples 5-7, and optionally, wherein the termination frame comprises a NAN availability attribute.

Example 9 includes the subject matter of any one of Examples 1-8, and optionally, wherein the apparatus is configured to cause the first NAN device to determine the NDL is to be terminated when all the NDPs over the NDL are terminated.

Example 10 includes the subject matter of any one of Examples 1-9, and optionally, wherein the apparatus is configured to cause the first NAN device to update an activity timer based on detected activity over at least one NDP over the NDL, and to terminate the NDL based on expiration of the activity timer.

Example 11 includes the subject matter of Example 10, and optionally, wherein the apparatus is configured to cause the first NAN device to update the activity timer based on a keep-alive frame from the second NAN device, the keep-alive frame to indicate that the NDPs over the NDL are not to be terminated.

Example 12 includes the subject matter of any one of Examples 1-11, and optionally, wherein the NDL comprises an NDL of at least one NDP of a unicast service.

Example 13 includes the subject matter of any one of Examples 1-12, and optionally, wherein the first NAN device is a Publisher of a unicast service.

Example 14 includes the subject matter of any one of Examples 1-12, and optionally, wherein the first NAN device is a Subscriber of a unicast service.

Example 15 includes the subject matter of any one of Examples 1-14, and optionally, comprising a radio.

Example 16 includes the subject matter of any one of Examples 1-15, and optionally, comprising one or more antennas, a processor, and a memory.

Example 17 includes a system of wireless communication comprising a first Neighbor Awareness Networking (NAN) device, the first NAN device comprising a radio; one or more antennas; a memory; a processor; and a controller configured to cause the first NAN device to transmit a message comprising a NAN Data Link (NDL) attribute corresponding to an NDL with a second NAN device, the NDL attribute comprising a Maximal (Max) Idle Period field to indicate a time period during which the second NAN device is allowed to refrain from transmitting over the NDL without the NDL being terminated; and allow the first NAN device to terminate all NAN Data Paths (NDPs) over the NDL, if any frame is not received from the second NAN device for at least the time period indicated by the Max Idle Period field.

Example 18 includes the subject matter of Example 17, and optionally, wherein the controller is configured to cause the first NAN device to transmit the message during establishment of an NDP.

Example 19 includes the subject matter of Example 18, and optionally, wherein the message comprises a Data Path request.

Example 20 includes the subject matter of Example 18, and optionally, wherein the message comprises a Data Path response.

Example 21 includes the subject matter of any one of Examples 17-20, and optionally, wherein the controller is configured to cause the first NAN device to transmit a termination frame to the second NAN device, the termination frame to indicate that the NDPs over the NDL with the second NAN device are to be terminated.

Example 22 includes the subject matter of Example 21, and optionally, wherein the termination frame comprises a NAN action frame comprising a data path termination subtype field.

Example 23 includes the subject matter of Example 21 or 22, and optionally, wherein the termination frame comprises an NDP attribute, the NDP attribute comprising a type field comprising a value to indicate termination.

Example 24 includes the subject matter of any one of Examples 21-23, and optionally, wherein the termination frame comprises a NAN availability attribute.

Example 25 includes the subject matter of any one of Examples 17-24, and optionally, wherein the controller is configured to cause the first NAN device to determine the NDL is to be terminated when all the NDPs over the NDL are terminated.

Example 26 includes the subject matter of any one of Examples 17-25, and optionally, wherein the controller is configured to cause the first NAN device to update an activity timer based on detected activity over at least one NDP over the NDL, and to terminate the NDL based on expiration of the activity timer.

Example 27 includes the subject matter of Example 26, and optionally, wherein the controller is configured to cause the first NAN device to update the activity timer based on a keep-alive frame from the second NAN device, the keep-alive frame to indicate that the NDPs over the NDL are not to be terminated.

Example 28 includes the subject matter of any one of Examples 17-27, and optionally, wherein the NDL comprises an NDL of at least one NDP of a unicast service.

Example 29 includes the subject matter of any one of Examples 17-28, and optionally, wherein the first NAN device is a Publisher of a unicast service.

Example 30 includes the subject matter of any one of Examples 17-28, and optionally, wherein the first NAN device is a Subscriber of a unicast service.

Example 31 includes a method to be performed at a first Neighbor Awareness Networking (NAN) device, the method comprising transmitting a message comprising a NAN Data Link (NDL) attribute corresponding to an NDL with at least one second NAN device, the NDL attribute comprising a Maximal (Max) Idle Period field to indicate a time period during which the second NAN device is allowed to refrain from transmitting over the NDL without the NDL being terminated; and allowing the first NAN device to terminate all NAN Data Paths (NDPs) over the NDL, if any frame is not received from the second NAN device for at least the time period indicated by the Max Idle Period field.

Example 32 includes the subject matter of Example 31, and optionally, comprising transmitting the message during establishment of an NDP.

Example 33 includes the subject matter of Example 32, and optionally, wherein the message comprises a Data Path request.

Example 34 includes the subject matter of Example 32, and optionally, wherein the message comprises a Data Path response.

Example 35 includes the subject matter of any one of Examples 31-34, and optionally, comprising transmitting a termination frame to the second NAN device, the termination frame to indicate that the NDPs over the NDL with the second NAN device are to be terminated.

Example 36 includes the subject matter of Example 35, and optionally, wherein the termination frame comprises a NAN action frame comprising a data path termination subtype field.

Example 37 includes the subject matter of Example 35 or 36, and optionally, wherein the termination frame comprises an NDP attribute, the NDP attribute comprising a type field comprising a value to indicate termination.

Example 38 includes the subject matter of any one of Examples 35-37, and optionally, wherein the termination frame comprises a NAN availability attribute.

Example 39 includes the subject matter of any one of Examples 31-38, and optionally, comprising determining the NDL is to be terminated when all the NDPs over the NDL are terminated.

Example 40 includes the subject matter of any one of Examples 31-39, and optionally, comprising updating an activity timer based on detected activity over at least one NDP over the NDL, and terminating the NDL based on expiration of the activity timer.

Example 41 includes the subject matter of Example 40, and optionally, comprising updating the activity timer based on a keep-alive frame from the second NAN device, the keep-alive frame to indicate that the NDPs over the NDL are not to be terminated.

Example 42 includes the subject matter of any one of Examples 31-41, and optionally, wherein the NDL comprises an NDL of at least one NDP of a unicast service.

Example 43 includes the subject matter of any one of Examples 31-42, and optionally, wherein the first NAN device is a Publisher of a unicast service.

Example 44 includes the subject matter of any one of Examples 31-42, and optionally, wherein the first NAN device is a Subscriber of a unicast service.

Example 45 includes a product including one or more tangible computer-readable non-transitory storage media comprising computer-executable instructions operable to, when executed by at least one computer processor, enable the at least one computer processor to cause a first Neighbor Awareness Networking (NAN) device to transmit a message comprising a NAN Data Link (NDL) attribute corresponding to an NDL with at least one second NAN device, the NDL attribute comprising a Maximal (Max) Idle Period field to indicate a time period during which the second NAN device is allowed to refrain from transmitting over the NDL without the NDL being terminated; and allow the first NAN device to terminate all NAN Data Paths (NDPs) over the NDL, if any frame is not received from the second NAN device for at least the time period indicated by the Max Idle Period field.

Example 46 includes the subject matter of Example 45, and optionally, wherein the instructions, when executed, cause the first NAN device to transmit the message during establishment of an NDP.

Example 47 includes the subject matter of Example 46, and optionally, wherein the message comprises a Data Path request.

Example 48 includes the subject matter of Example 46, and optionally, wherein the message comprises a Data Path response.

Example 49 includes the subject matter of any one of Examples 45-48, and optionally, wherein the instructions, when executed, cause the first NAN device to transmit a termination frame to the second NAN device, the termination frame to indicate that the NDPs over the NDL with the second NAN device are to be terminated.

Example 50 includes the subject matter of Example 49, and optionally, wherein the termination frame comprises a NAN action frame comprising a data path termination subtype field.

Example 51 includes the subject matter of Example 49 or 50, and optionally, wherein the termination frame comprises an NDP attribute, the NDP attribute comprising a type field comprising a value to indicate termination.

Example 52 includes the subject matter of any one of Examples 49-51, and optionally, wherein the termination frame comprises a NAN availability attribute.

Example 53 includes the subject matter of any one of Examples 45-52, and optionally, wherein the instructions, when executed, cause the first NAN device to determine the NDL is to be terminated when all the NDPs over the NDL are terminated.

Example 54 includes the subject matter of any one of Examples 45-53, and optionally, wherein the instructions, when executed, cause the first NAN device to update an activity timer based on detected activity over at least one NDP over the NDL, and to terminate the NDL based on expiration of the activity timer.

Example 55 includes the subject matter of Example 54, and optionally, wherein the instructions, when executed, cause the first NAN device to update the activity timer based on a keep-alive frame from the second NAN device, the keep-alive frame to indicate that the NDPs over the NDL are not to be terminated.

Example 56 includes the subject matter of any one of Examples 45-55, and optionally, wherein the NDL comprises an NDL of at least one NDP of a unicast service.

Example 57 includes the subject matter of any one of Examples 45-56, and optionally, wherein the first NAN device is a Publisher of a unicast service.

Example 58 includes the subject matter of any one of Examples 45-56, and optionally, wherein the first NAN device is a Subscriber of a unicast service.

Example 59 includes an apparatus of wireless communication by a first Neighbor Awareness Networking (NAN) device, the apparatus comprising means for transmitting a message comprising a NAN Data Link (NDL) attribute corresponding to an NDL with at least one second NAN device, the NDL attribute comprising a Maximal (Max) Idle Period field to indicate a time period during which the second NAN device is allowed to refrain from transmitting over the NDL without the NDL being terminated; and means for allowing the first NAN device to terminate all NAN Data Paths (NDPs) over the NDL, if any frame is not received from the second NAN device for at least the time period indicated by the Max Idle Period field.

Example 60 includes the subject matter of Example 59, and optionally, comprising means for transmitting the message during establishment of an NDP.

Example 61 includes the subject matter of Example 60, and optionally, wherein the message comprises a Data Path request.

Example 62 includes the subject matter of Example 60, and optionally, wherein the message comprises a Data Path response.

Example 63 includes the subject matter of any one of Examples 59-62, and optionally, comprising means for transmitting a termination frame to the second NAN device, the termination frame to indicate that the NDPs over the NDL with the second NAN device are to be terminated.

Example 64 includes the subject matter of Example 63, and optionally, wherein the termination frame comprises a NAN action frame comprising a data path termination subtype field.

Example 65 includes the subject matter of Example 63 or 64, and optionally, wherein the termination frame comprises an NDP attribute, the NDP attribute comprising a type field comprising a value to indicate termination.

Example 66 includes the subject matter of any one of Examples 63-65, and optionally, wherein the termination frame comprises a NAN availability attribute.

Example 67 includes the subject matter of any one of Examples 59-66, and optionally, comprising means for determining the NDL is to be terminated when all the NDPs over the NDL are terminated.

Example 68 includes the subject matter of any one of Examples 59-67, and optionally, comprising means for updating an activity timer based on detected activity over at least one NDP over the NDL, and terminating the NDL based on expiration of the activity timer.

Example 69 includes the subject matter of Example 68, and optionally, comprising means for updating the activity timer based on a keep-alive frame from the second NAN device, the keep-alive frame to indicate that the NDPs over the NDL are not to be terminated.

Example 70 includes the subject matter of any one of Examples 59-69, and optionally, wherein the NDL comprises an NDL of at least one NDP of a unicast service.

Example 71 includes the subject matter of any one of Examples 59-70, and optionally, wherein the first NAN device is a Publisher of a unicast service.

Example 72 includes the subject matter of any one of Examples 59-70, and optionally, wherein the first NAN device is a Subscriber of a unicast service.

Example 73 includes an apparatus comprising logic and circuitry configured to cause a first Neighbor Awareness Networking (NAN) device to set up a NAN service path with at least one second NAN device; and transmit a termination frame to terminate a participation of the first NAN device in the NAN service path, the termination frame comprises a NAN action frame comprising a data path termination subtype field.

Example 74 includes the subject matter of Example 73, and optionally, wherein the NAN service path comprises a NAN Data Path (NDP) of a unicast service between the first NAN device and the second NAN device.

Example 75 includes the subject matter of Example 74, and optionally, wherein the termination frame comprises an NDP attribute, the NDP attribute comprising a type field comprising a value to indicate termination.

Example 76 includes the subject matter of Example 74 or 75, and optionally, wherein the first NAN device is a Publisher of the unicast service.

Example 77 includes the subject matter of Example 74 or 75, and optionally, wherein the first NAN device is a Subscriber of the unicast service.

Example 78 includes the subject matter of any one of Examples 74-77, and optionally, wherein the apparatus is configured to cause the first NAN device to update an activity timer based on detected activity over the NDP, and to terminate the NDP based on expiration of the activity timer.

Example 79 includes the subject matter of any one of Examples 74-78, and optionally, wherein the apparatus is configured to cause the first NAN device to transmit a keep-alive frame prior to expiration of a keep alive timer to indicate that the NDP is not to be terminated.

Example 80 includes the subject matter of Example 73, and optionally, wherein the NAN service path comprises a NAN Multicast Service Group (NMSG), the first NAN device comprising an enroller of the NMSG.

Example 81 includes the subject matter of Example 80, and optionally, wherein the termination frame comprises an NMSG attribute, the NMSG attribute comprising a type field comprising a value to indicate termination.

Example 82 includes the subject matter of Example 81, and optionally, wherein the NMSG attribute comprises an NMSG Identifier (ID) corresponding to the NMSG.

Example 83 includes the subject matter of any one of Examples 80-82, and optionally, wherein the NMSG comprises a one-to-many NMSG, the first NAN device comprises a single enroller of the NMSG.

Example 84 includes the subject matter of any one of Examples 80-82, and optionally, wherein the NMSG comprises a many-to-many NMSG comprising a plurality of enrollers.

Example 85 includes the subject matter of any one of Examples 73-84, and optionally, wherein the termination frame comprises a NAN availability attribute.

Example 86 includes the subject matter of any one of Examples 73-85, and optionally, comprising a radio.

Example 87 includes the subject matter of any one of Examples 73-86, and optionally, comprising one or more antennas, a processor, and a memory.

Example 88 includes a system of wireless communication comprising a first Neighbor Awareness Networking (NAN) device, the first NAN device comprising a radio; one or more antennas; a memory; a processor; and a controller configured to cause the first NAN device to set up a NAN service path with at least one second NAN device; and transmit a termination frame to terminate a participation of the first NAN device in the NAN service path, the termination frame comprises a NAN action frame comprising a data path termination subtype field.

Example 89 includes the subject matter of Example 88, and optionally, wherein the NAN service path comprises a NAN Data Path (NDP) of a unicast service between the first NAN device and the second NAN device.

Example 90 includes the subject matter of Example 89, and optionally, wherein the termination frame comprises an NDP attribute, the NDP attribute comprising a type field comprising a value to indicate termination.

Example 91 includes the subject matter of Example 89 or 90, and optionally, wherein the first NAN device is a Publisher of the unicast service.

Example 92 includes the subject matter of Example 89 or 90, and optionally, wherein the first NAN device is a Subscriber of the unicast service.

Example 93 includes the subject matter of any one of Examples 89-92, and optionally, wherein the controller is configured to cause the first NAN device to update an activity timer based on detected activity over the NDP, and to terminate the NDP based on expiration of the activity timer.

Example 94 includes the subject matter of any one of Examples 89-93, and optionally, wherein the controller is configured to cause the first NAN device to transmit a keep-alive frame prior to expiration of a keep alive timer to indicate that the NDP is not to be terminated.

Example 95 includes the subject matter of Example 88, and optionally, wherein the NAN service path comprises a NAN Multicast Service Group (NMSG), the first NAN device comprising an enroller of the NMSG.

Example 96 includes the subject matter of Example 95, and optionally, wherein the termination frame comprises an NMSG attribute, the NMSG attribute comprising a type field comprising a value to indicate termination.

Example 97 includes the subject matter of Example 96, and optionally, wherein the NMSG attribute comprises an NMSG Identifier (ID) corresponding to the NMSG.

Example 98 includes the subject matter of any one of Examples 95-97, and optionally, wherein the NMSG comprises a one-to-many NMSG, the first NAN device comprises a single enroller of the NMSG.

Example 99 includes the subject matter of any one of Examples 95-97, and optionally, wherein the NMSG comprises a many-to-many NMSG comprising a plurality of enrollers.

Example 100 includes the subject matter of any one of Examples 88-99, and optionally, wherein the termination frame comprises a NAN availability attribute.

Example 101 includes a method to be performed at a first Neighbor Awareness Networking (NAN) device, the method comprising setting up a NAN service path with at least one second NAN device; and transmitting a termination frame to terminate a participation of the first NAN device in the NAN service path, the termination frame comprises a NAN action frame comprising a data path termination subtype field.

Example 102 includes the subject matter of Example 101, and optionally, wherein the NAN service path comprises a NAN Data Path (NDP) of a unicast service between the first NAN device and the second NAN device.

Example 103 includes the subject matter of Example 102, and optionally, wherein the termination frame comprises an NDP attribute, the NDP attribute comprising a type field comprising a value to indicate termination.

Example 104 includes the subject matter of Example 102 or 103, and optionally, wherein the first NAN device is a Publisher of the unicast service.

Example 105 includes the subject matter of Example 102 or 103, and optionally, wherein the first NAN device is a Subscriber of the unicast service.

Example 106 includes the subject matter of any one of Examples 102-105, and optionally, comprising updating an activity timer based on detected activity over the NDP, and terminating the NDP based on expiration of the activity timer.

Example 107 includes the subject matter of any one of Examples 102-106, and optionally, comprising transmitting a keep-alive frame prior to expiration of a keep alive timer to indicate that the NDP is not to be terminated.

Example 108 includes the subject matter of Example 101, and optionally, wherein the NAN service path comprises a NAN Multicast Service Group (NMSG), the first NAN device comprising an enroller of the NMSG.

Example 109 includes the subject matter of Example 108, and optionally, wherein the termination frame comprises an NMSG attribute, the NMSG attribute comprising a type field comprising a value to indicate termination.

Example 110 includes the subject matter of Example 109, and optionally, wherein the NMSG attribute comprises an NMSG Identifier (ID) corresponding to the NMSG.

Example 111 includes the subject matter of any one of Examples 108-110, and optionally, wherein the NMSG comprises a one-to-many NMSG, the first NAN device comprises a single enroller of the NMSG.

Example 112 includes the subject matter of any one of Examples 108-110, and optionally, wherein the NMSG comprises a many-to-many NMSG comprising a plurality of enrollers.

Example 113 includes the subject matter of any one of Examples 101-112, and optionally, wherein the termination frame comprises a NAN availability attribute.

Example 114 includes a product including one or more tangible computer-readable non-transitory storage media comprising computer-executable instructions operable to, when executed by at least one computer processor, enable the at least one computer processor to cause a first Neighbor Awareness Networking (NAN) device to set up a NAN service path with at least one second NAN device; and transmit a termination frame to terminate a participation of the first NAN device in the NAN service path, the termination frame comprises a NAN action frame comprising a data path termination subtype field.

Example 115 includes the subject matter of Example 114, and optionally, wherein the NAN service path comprises a NAN Data Path (NDP) of a unicast service between the first NAN device and the second NAN device.

Example 116 includes the subject matter of Example 115, and optionally, wherein the termination frame comprises an NDP attribute, the NDP attribute comprising a type field comprising a value to indicate termination.

Example 117 includes the subject matter of Example 115 or 116, and optionally, wherein the first NAN device is a Publisher of the unicast service.

Example 118 includes the subject matter of Example 115 or 116, and optionally, wherein the first NAN device is a Subscriber of the unicast service.

Example 119 includes the subject matter of any one of Examples 115-118, and optionally, wherein the instructions, when executed, cause the first NAN device to update an activity timer based on detected activity over the NDP, and to terminate the NDP based on expiration of the activity timer.

Example 120 includes the subject matter of any one of Examples 115-119, and optionally, wherein the instructions, when executed, cause the first NAN device to transmit a keep-alive frame prior to expiration of a keep alive timer to indicate that the NDP is not to be terminated.

Example 121 includes the subject matter of Example 114, and optionally, wherein the NAN service path comprises a NAN Multicast Service Group (NMSG), the first NAN device comprising an enroller of the NMSG.

Example 122 includes the subject matter of Example 121, and optionally, wherein the termination frame comprises an NMSG attribute, the NMSG attribute comprising a type field comprising a value to indicate termination.

Example 123 includes the subject matter of Example 122, and optionally, wherein the NMSG attribute comprises an NMSG Identifier (ID) corresponding to the NMSG.

Example 124 includes the subject matter of any one of Examples 121-123, and optionally, wherein the NMSG comprises a one-to-many NMSG, the first NAN device comprises a single enroller of the NMSG.

Example 125 includes the subject matter of any one of Examples 121-123, and optionally, wherein the NMSG comprises a many-to-many NMSG comprising a plurality of enrollers.

Example 126 includes the subject matter of any one of Examples 114-125, and optionally, wherein the termination frame comprises a NAN availability attribute.

Example 127 includes an apparatus of wireless communication by a first Neighbor Awareness Networking (NAN) device, the apparatus comprising means for setting up a NAN service path with at least one second NAN device; and means for transmitting a termination frame to terminate a participation of the first NAN device in the NAN service path, the termination frame comprises a NAN action frame comprising a data path termination subtype field.

Example 128 includes the subject matter of Example 127, and optionally, wherein the NAN service path comprises a NAN Data Path (NDP) of a unicast service between the first NAN device and the second NAN device.

Example 129 includes the subject matter of Example 128, and optionally, wherein the termination frame comprises an NDP attribute, the NDP attribute comprising a type field comprising a value to indicate termination.

Example 130 includes the subject matter of Example 128 or 129, and optionally, wherein the first NAN device is a Publisher of the unicast service.

Example 131 includes the subject matter of Example 128 or 129, and optionally, wherein the first NAN device is a Subscriber of the unicast service.

Example 132 includes the subject matter of any one of Examples 128-131, and optionally, comprising means for updating an activity timer based on detected activity over the NDP, and terminating the NDP based on expiration of the activity timer.

Example 133 includes the subject matter of any one of Examples 128-132, and optionally, comprising means for transmitting a keep-alive frame prior to expiration of a keep alive timer to indicate that the NDP is not to be terminated.

Example 134 includes the subject matter of Example 127, and optionally, wherein the NAN service path comprises a NAN Multicast Service Group (NMSG), the first NAN device comprising an enroller of the NMSG.

Example 135 includes the subject matter of Example 134, and optionally, wherein the termination frame comprises an NMSG attribute, the NMSG attribute comprising a type field comprising a value to indicate termination.

Example 136 includes the subject matter of Example 135, and optionally, wherein the NMSG attribute comprises an NMSG Identifier (ID) corresponding to the NMSG.

Example 137 includes the subject matter of any one of Examples 134-136, and optionally, wherein the NMSG comprises a one-to-many NMSG, the first NAN device comprises a single enroller of the NMSG.

Example 138 includes the subject matter of any one of Examples 134-136, and optionally, wherein the NMSG comprises a many-to-many NMSG comprising a plurality of enrollers.

Example 139 includes the subject matter of any one of Examples 127-138, and optionally, wherein the termination frame comprises a NAN availability attribute.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause a first Neighbor Awareness Networking (NAN) device to:
      set up a NAN Data Path (NDP) with a second NAN device based on an exchange of a data path request and a data path response with the second NAN device, the NDP for data communication of a unicast service between the first NAN device and the second NAN device;
      set a type subfield of an NDP attribute to include a predefined type value to indicate termination, wherein the type subfield comprises bits 0 to 3 in an 8-bit type and status field, and wherein the predefined type value comprises a value of "4"; and
      transmit to the second NAN device a termination NAN Action Frame (NAF) to terminate the NDP, the termination NAF comprising the NDP attribute.

2. The apparatus of claim 1 configured to cause the first NAN device to transmit a NAN Data Link (NDL) attribute comprising a maximal (max) idle period field to indicate a period of time during which the second NAN device is allowed to refrain from transmitting over an NDL without being terminated.

3. The apparatus of claim 2 configured to allow the first NAN device to terminate all NDPs over the NDL when any frame from the second NAN device is not received by the first NAN device for a time period greater than or equal to the period of time indicated by the max idle period field.

4. The apparatus of claim 2 configured to cause the first NAN device to set the max idle period field to indicate the period of time in units of 1024 Time Units (TU), the max idle period field having a size of two octets.

5. The apparatus of claim 2, wherein the NDL attribute comprises an NDL control field, the NDL control field comprising a 1-bit max-idle-period-present field having a value of "1" to indicate that the max idle period field is included in the NDL attribute.

6. The apparatus of claim 2 configured to cause the first NAN device to transmit the NDL attribute as part of the data path request or the data path response.

7. The apparatus of claim 2 configured to cause the first NAN device to set a timer based on the period of time indicated by the max idle period field, to update the timer based on a frame from the second NAN device, and to allow the first NAN device to terminate all NDPs over the NDL based on expiration of the timer.

8. The apparatus of claim 1, wherein the termination NAF comprises a NAN availability attribute.

9. The apparatus of claim 1 configured to cause the first NAN device to set up the NDP as an NDP initiator based on transmission of the data path request to the second NAN device and reception of the data path response from the second NAN device.

10. The apparatus of claim 1 configured to cause the first NAN device to set up the NDP as an NDP responder based on reception of the data path request from the second NAN device and transmission of the data path response to the second NAN device.

11. The apparatus of claim 1 comprising a radio to communicate the data path request and the data path response with the second NAN device, and to transmit the termination NAF.

12. The apparatus of claim 11 comprising one or more antennas connected to the radio, and another processor to execute instructions of an operating system (OS) of the first NAN device.

13. A product comprising one or more tangible computer-readable non-transitory storage media comprising computer-executable instructions operable to, when executed by at least one processor, enable the at least one processor to cause a first Neighbor Awareness Networking (NAN) device to:
   set up a NAN Data Path (NDP) with a second NAN device based on an exchange of a data path request and a data path response with the second NAN device, the NDP for data communication of a unicast service between the first NAN device and the second NAN device;
   set a type subfield of an NDP attribute to include a predefined type value to indicate termination, wherein the type subfield comprises bits 0 to 3 in an 8-bit type and status field, and wherein the predefined type value comprises a value of "4"; and transmit to the second NAN device a termination NAN Action Frame (NAF) to terminate the NDP, the termination NAF comprising the NDP attribute.

14. The product of claim 13, wherein the instructions, when executed, cause the first NAN device to transmit a NAN Data Link (NDL) attribute comprising a maximal (max) idle period field to indicate a period of time during which the second NAN device is allowed to refrain from transmitting over an NDL without being terminated.

15. The product of claim 14, wherein the instructions, when executed, allow the first NAN device to terminate all NDPs over the NDL when any frame from the second NAN device is not received by the first NAN device for a time period greater than or equal to the period of time indicated by the max idle period field.

16. The product of claim 14, wherein the instructions, when executed, cause the first NAN device to transmit the NDL attribute as part of the data path request or the data path response.

17. The product of claim 14, wherein the instructions, when executed, cause the first NAN device to set a timer based on the period of time indicated by the max idle period field, to update the timer based on a frame from the second NAN device, and to allow the first NAN device to terminate all NDPs over the NDL based on expiration of the timer.

18. The product of claim 13, wherein the termination NAF comprises a NAN availability attribute.

19. The product of claim 13, wherein the instructions, when executed, cause the first NAN device to set up the NDP as an NDP initiator based on transmission of the data path request to the second NAN device and reception of the data path response from the second NAN device.

20. The product of claim 13, wherein the instructions, when executed, cause the first NAN device to set up the NDP as an NDP responder based on reception of the data path request from the second NAN device and transmission of the data path response to the second NAN device.

21. An apparatus comprising:
means for causing a first Neighbor Awareness Networking (NAN) device to set up a NAN Data Path (NDP) with a second NAN device based on an exchange of a data path request and a data path response with the second NAN device, the NDP for data communication of a unicast service between the first NAN device and the second NAN device;

means for causing the first NAN device to set a type subfield of an NDP attribute to include a predefined type value to indicate termination, wherein the type subfield comprises bits 0 to 3 in an 8-bit type and status field, and wherein the predefined type value comprises a value of "4"; and means for causing the first NAN device to transmit to the second NAN device a termination NAN Action Frame (NAF) to terminate the NDP, the termination NAF comprising the NDP attribute.

22. The apparatus of claim 21 comprising means for causing the first NAN device to transmit a NAN Data Link (NDL) attribute comprising a maximal (max) idle period field to indicate a period of time during which the second NAN device is allowed to refrain from transmitting over an NDL without being terminated.

* * * * *